(12) United States Patent
Choi et al.

(10) Patent No.: US 12,317,269 B2
(45) Date of Patent: May 27, 2025

(54) METHOD AND APPARATUS FOR TRANSMITTING UPLINK CONTROL INFORMATION THROUGH MULTIPLE UPLINK CHANNELS IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 17/760,959

(22) PCT Filed: Sep. 15, 2020

(86) PCT No.: PCT/KR2020/012432
§ 371 (c)(1),
(2) Date: Mar. 16, 2022

(87) PCT Pub. No.: WO2021/066349
PCT Pub. Date: Apr. 8, 2021

(65) Prior Publication Data
US 2022/0408429 A1 Dec. 22, 2022

(30) Foreign Application Priority Data
Oct. 2, 2019 (KR) .......................... 10-2019-0122546

(51) Int. Cl.
*H04W 72/21* (2023.01)
*H04L 1/1812* (2023.01)

(52) U.S. Cl.
CPC ........... *H04W 72/21* (2023.01); *H04L 1/1812* (2013.01)

(58) Field of Classification Search
CPC ............................. H04W 72/21; H04L 1/1812
See application file for complete search history.

(56) References Cited

U.S. PATENT DOCUMENTS

| 9,161,348 B2 | 10/2015 | Papasakellariou et al. |
| 9,210,695 B2 | 12/2015 | Kim et al. |

(Continued)

FOREIGN PATENT DOCUMENTS

KR 10-2014-0143754 A 12/2014

OTHER PUBLICATIONS

Intel Corporation, "On Multi-TRP/multi-panel transmission," XP051728992, 3GPP TSG RAN WG1, Meeting #97, R1-1907559, Reno, Nevada, USA, May 13-17, 2019.

(Continued)

*Primary Examiner* — James P Duffy
(74) *Attorney, Agent, or Firm* — Jefferson IP Law, LLP

(57) ABSTRACT

The present disclosure relates to a method and apparatus for transmitting uplink transmission channels in a wireless communication system. A method, performed by a user equipment (UE), of transmitting an uplink channel includes: determining a transmission resource of at least one physical uplink control channel (PUCCH) for transmitting uplink control information (UCI), determining a transmission resource of a first physical uplink shared channel (PUSCH) to be transmitted to a first transmission and reception point (TRP), the first PUSCH overlapping the at least one PUCCH on a time resource, determining a transmission resource of a second PUSCH to be transmitted to a second TRP, the second PUSCH overlapping the at least one PUCCH on the time resource, multiplexing the UCI to at least one PUSCH (Continued)

from among the first PUSCH and the second PUSCH, transmitting the first PUSCH to the first TRP, and transmitting the second PUSCH to the second TRP.

13 Claims, 11 Drawing Sheets

(56) References Cited

U.S. PATENT DOCUMENTS

| | | | |
|---|---|---|---|
| 9,398,573 B2 | 7/2016 | Papasakellariou et al. | |
| 9,763,233 B2 | 9/2017 | Uchino et al. | |
| 11,564,211 B2* | 1/2023 | Matsumura | H04B 1/715 |
| 2016/0014753 A1* | 1/2016 | Wu | H04L 27/2607 |
| | | | 370/280 |
| 2019/0182825 A1 | 6/2019 | Koorapaty et al. | |
| 2019/0320431 A1* | 10/2019 | Huang | H04L 5/0078 |
| 2019/0349917 A1* | 11/2019 | Huang | H04W 72/21 |
| 2021/0144702 A1* | 5/2021 | Zhao | H04W 72/23 |

OTHER PUBLICATIONS

Huawei, HiSilicon, "Summary of Enhancements on Multi-TRP/Panel Transmission," 3GPP TSG RAN WGI Meeting #98, RI-1909602, XP051766198, Prague, Czech Republic, Aug. 26-30, 2019.
European Search Report dated Oct. 10, 2022, issued in European Application No. 20872777.6.
International Search Report dated Dec. 17, 2020, issued in International Application No. PCT/KR2020/012432.
Korean Office Action with English translation dated Feb. 11, 2025; Korean Appln. No. 10-2019-0122546.
European Notice of Allowance dated Dec. 12, 2024; European Appln. No. 20 872 777.6-1206.

* cited by examiner

METHOD AND APPARATUS FOR TRANSMITTING UPLINK CONTROL INFORMATION THROUGH MULTIPLE UPLINK CHANNELS IN WIRELESS COMMUNICATION SYSTEM

TECHNICAL FIELD

The present disclosure relates to a method and apparatus for transmitting uplink transmission channels in a wireless communication system.

BACKGROUND ART

To meet the increase in demand with respect to wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems. 5G communication systems defined by 3rd generation partnership project (3GPP) is called new radio (NR) systems. To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system, are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

DESCRIPTION OF EMBODIMENTS

Technical Problem

As it is possible to provide various services according to the development of wireless communication systems, there is a need for a method of effectively providing these services.

Solution to Problem

The present disclosure relates to a method and apparatus for transmitting uplink transmission channels in a wireless communication system. A method, performed by a user equipment (UE), of transmitting an uplink channel, according to an embodiment, may include determining a transmission resource of at least one physical uplink control channel (PUCCH) for transmitting uplink control information (UCI), determining a transmission resource of a first physical uplink shared channel (PUSCH) to be transmitted to a first transmission and reception point (TRP), the first PUSCH overlapping the at least one PUCCH on a time resource, determining a transmission resource of a second PUSCH to be transmitted to a second TRP, the second PUSCH overlapping the at least one PUCCH on the time resource, multiplexing the UCI to at least one PUSCH from among the first PUSCH and the second PUSCH, transmitting the first PUSCH to the first TRP, and transmitting the second PUSCH to the second TRP.

A UE for transmitting an uplink channel in a wireless communication system, according to an embodiment of the present disclosure, may include a transceiver, and at least one processor connected to the transceiver, wherein the at least one processor is configured to determine a transmission resource of at least one PUCCH for transmitting UCI, determine a transmission resource of a first PUSCH to be transmitted to a first TRP, the first PUSCH overlapping the at least one PUCCH on a time resource, determine a transmission resource of a second PUSCH to be transmitted to a second TRP, the second PUSCH overlapping the at least one PUCCH on the time resource, multiplex the UCI to at least one PUSCH from among the first PUSCH and the second PUSCH, transmit the first PUSCH to the first TRP, and transmit the second PUSCH to the second TRP.

MODE OF DISCLOSURE

Figure 1:
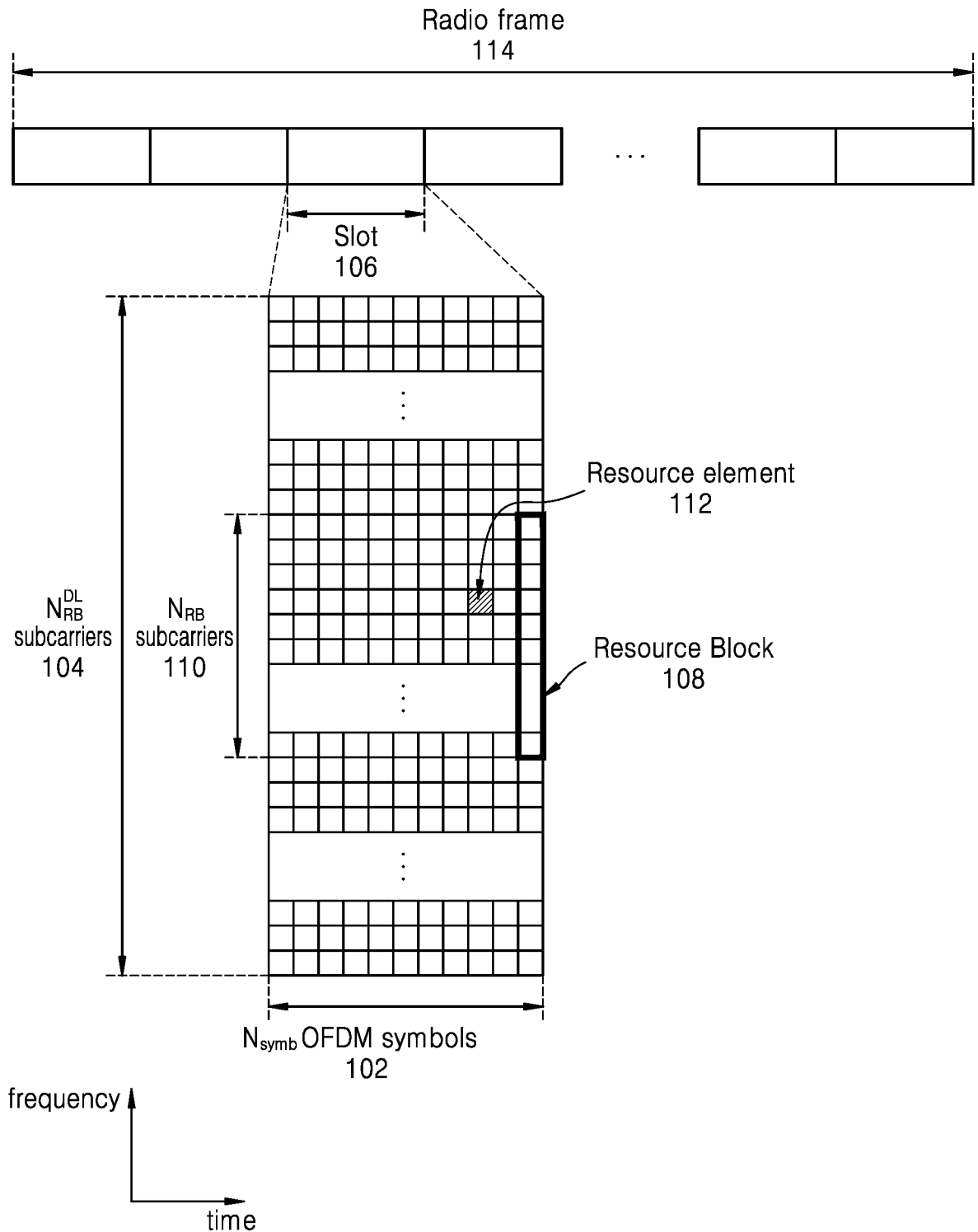
FIG. 1 is a diagram illustrating a transmission structure of a time-frequency domain that is a radio resource domain in a 5th generation (5G) or new radio (NR) system, according to an embodiment of the present disclosure.

Hereinafter, embodiments will be described in detail with reference to the accompanying drawings.

In describing the embodiments, descriptions of technical contents that are well known in the technical field to which the present disclosure pertains and are not directly related to the present disclosure will be omitted. By omitting unnecessary description, the present disclosure may be described more clearly without obscuring the gist of the present disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Advantages and features of the present disclosure, and methods of achieving them will be clarified with reference to embodiments described below in detail with reference to the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The present disclosure is only defined by the scope of the claims. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term " . . . er/or" as used herein refers to a software element or a hardware element such as field programmable gate array (FPGA) or application specific integrated circuit (ASIC), and the "module" or " . . . er/or" performs certain functions. However, the term " . . . er/or" is not limited to software or hardware. The term " . . . er/or" may be configured in an addressable storage medium or may be configured to reproduce one or more processors. Therefore, for example, the term " . . . er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the " . . . ers/ors" may be combined with fewer elements and ". . . ers/ors", or may be separated from additional elements and " . . . ers/ors". Furthermore, the elements and the " . . . ers/ors" may be implemented to reproduce one or more central processing units (CPUs) in the device or secure multimedia card. Also, in embodiments of the present disclosure, the " . . . er/or" may include one or more processors.

A wireless communication system has evolved from a system providing voice-oriented services to a broadband wireless communication system providing high speed high quality packet data services of communication standards such as high speed packet access (HSPA) of 3rd generation partnership project (3GPP), long term evolution (LTE) or evolved universal terrestrial radio access (E-UTRA), LTE-advanced (LTE-A), high rate packet data (HRPD) of 3GPP2, ultra mobile broadband (UMB), and Institute of Electrical and Electronics Engineers (IEEE) 802.16e. In addition, 5G or NR communication standards for 5G wireless communication systems are being established.

In a 5G or NR system that is a representative example of a broadband wireless communication system, an orthogonal frequency division multiplexing (OFDM) scheme is employed in a downlink (DL) and an uplink (UL). More specifically, a cyclic-prefix OFDM (CP-OFDM) scheme is employed in a DL, and a discrete Fourier transform spreading OFDM (DFT-S-OFDM) scheme is employed in a UL along with CP-OFDM. The UL refers to a radio link through which a terminal (user equipment (UE) or mobile station (MS)) transmits data or a control signal to a base station (gNode B, eNode B, or BS), and the DL refers to a radio link through which a base station transmits data or a control signal to a terminal. In the multiple access scheme as described above, data or control information of each user may be identified by performing allocation and operation so that time-frequency resources for carrying data or control information for each user do not overlap each other, that is, orthogonality is established.

The 5G or NR system employs a hybrid automatic repeat request (HARQ) scheme for retransmitting corresponding data in a physical layer when a decoding failure occurs in initial transmission. In the HARQ scheme, when a receiver fails to decode data correctly, the receiver transmits information (negative acknowledgment (NACK)) indicating a decoding failure to a transmitter, so that the transmitter retransmits the corresponding data in a physical layer. The receiver combines the data retransmitted by the transmitter with the previously decoding-failed data to improve data reception performance. Also, when the receiver decodes data correctly, the receiver transmits information (acknowledgment (ACK)) indicating a decoding success to the transmitter, so that the transmitter transmits new data.

On the other hand, an NR system (NR access technology system) that is new 5G communication is being designed so that various services are freely multiplexed in time and frequency resources. Accordingly, waveform/numerology and a reference signal may be allocated dynamically or freely according to the needs of the corresponding services. In order to provide an optimal service to a terminal in wireless communication, it is important to optimize data transmission through measurement of channel quality and interference, and accordingly, accurate channel status measurement is essential. In 4G communication, channel and interference characteristics do not change greatly depending on frequency resources. However, in 5G or NR channels, channel and interference characteristics change greatly depending on the service. Therefore, It is necessary to support a frequency resource group (FRG)-level subset so as to measure channel and interference characteristics separately. On the other hand, in the 5G or NR system, the types of supported services may be divided into categories such as enhanced mobile broadband (eMBB), massive machine type communications (mMTC), and ultra-reliable and low-latency communications (URLLC). eMBB is a service that aims for high-speed transmission of high-capacity data, mMTC is a service that aims for minimization of terminal power and access of multiple terminals, and URLLC is a service that aims for high reliability and low latency. Different requirements may be applied according to the type of service applied to the terminal.

Of the services described above, the URLLC service aims for high reliability and low latency, and thus, control information and data information transmittable through a physical channel need to be transmitted at a low coding rate. In the case of control information, the repeated control information transmission function has already been introduced in LTE-MTC or narrow band Internet-of-things (NB-IoT) service. This is introduced to provide high coverage for terminals having a small bandwidth, and delay time has not been sufficiently taken into account. The minimum unit for repeated transmission of control information is fixed in units of subframes on the basis of LTE. In order to support the URLLC service in the NR or 5G system, it is necessary to introduce a repeated control information transmission mode capable of improving reliability while requiring low latency. Therefore, in the present disclosure, a situation in which control information is repeatedly transmitted on a slot is basically taken into account. Additionally, a situation in which control information transmittable across a slot boundary is repeatedly transmitted is also taken into account. Through operations according to the embodiment of the present disclosure, the terminal may detect control information transmitted from the base station more quickly with high reliability.

The terms as used herein are those defined by taking into account functions, but the terms may vary depending on the intention of users or those of ordinary skill in the art, precedents, or the like. Therefore, the definitions should be made based on the contents throughout the specification. Hereinafter, a base station allocates resources to a terminal, and may include at least one of a gNode B (gNB), an eNode B (eNB), a Node B, a BS, a radio access unit, a base station controller, or a node on a network. Examples of a terminal may include a UE, a MS, a cellular phone, a smartphone, a computer, or a multimedia system capable of performing a communication function. In the present disclosure, the DL refers to a radio transmission path of a signal transmitted from a base station to a terminal, and the UL refers to a radio transmission path of a signal transmitted from a terminal to a base station. Although the NR system will be described as an example, the present disclosure is not limited thereto. Embodiments of the present disclosure may also be applied to various communication systems having similar technical background or channel types. Also, embodiments of the present disclosure may also be applied to other communication systems through some modifications without departing from the scope of the present disclosure.

In the present disclosure, the terms "physical channel" and "signal" may be used interchangeably with data or a control signal. For example, a physical downlink shared channel (PDSCH) is a physical channel on which data is transmitted, but PDSCH may also be referred to as data.

In the present disclosure, higher layer signaling is a signal transmission method by which a base station transmits a signal to a terminal by using a downlink data channel of a physical layer, or a terminal transmits a signal to a base station by using an uplink data channel of a physical layer. The higher layer signaling may also be referred to as radio resource control (RRC) signaling or media access control (MAC) control element (CE).

On the other hand, as research into next-generation communication systems is in progress, various methods of scheduling communication with a terminal are being discussed. Accordingly, there is a need for an efficient scheduling and data transmission and reception method considering characteristics of a next-generation communication system. Accordingly, in order to provide a plurality of services to a user in a communication system, there is a need for a method capable of providing each service within the same time interval according to characteristics of the corresponding service and an apparatus using the same.

The NR system employs a HARQ scheme for retransmitting corresponding data in a physical layer when a decoding failure occurs in initial transmission. In the HARQ scheme, when a receiver fails to decode data correctly, the receiver transmits information (NACK) indicating a decoding failure to a transmitter, so that the transmitter retransmits the corresponding data in a physical layer. The receiver combines the data retransmitted by the transmitter with the previously decoding-failed data to improve data reception performance. Also, when the receiver decodes data correctly, the receiver transmits information (ACK) indicating a decoding success to the transmitter, so that the transmitter transmits new data.

Hereinafter, a method and apparatus for transmitting HARQ-ACK feedback for DL data transmission, according to the present disclosure, will be described. Specifically, a method of configuring HARQ-ACK feedback bits when a terminal transmits multiple HARQ-ACKs in one slot through a UL will be described.

In a wireless communication system, particularly in an NR system, a base station may configure one or more component carriers (CCs) in a terminal for DL transmission. Also, DL transmission and UL transmission slots and symbols may be configured on each CC. On the other hand, when a PDSCH that is DL data is scheduled, at least one of timing information of a slot to which the PDSCH is mapped, and information about a start symbol position to which the PDSCH is mapped within a corresponding slot and the number of symbols to which PDSCH is mapped may be transmitted in a specific bit field of downlink control information (DCI). For example, in case that the DCI is transmitted on slot n to schedule the PDSCH, when the slot timing information K0 for transmitting the PDSCH indicates 0, the start symbol position is 0, and the symbol length is 7, the corresponding PDSCH is transmitted by being mapped to seven symbols from symbol 0 of slot n. On the other hand, the PDSCH that is a DL data signal is transmitted, and HARQ-ACK feedback is transmitted from a terminal to a base station after K1 slots. K1 information that is timing information at which HARQ-ACK is transmitted is delivered in DCI, available candidate set of K1 value may be delivered by higher layer signaling, and one of the candidates may be determined in DCI.

When the terminal is configured with a semi-static HARQ-ACK codebook, a feedback bit (or a HARQ-ACK codebook size) to be transmitted may be determined by Table including slot information K0 to which the PDSCH is mapped, start symbol information, the number of symbols, or length information, and K1 candidate values that are HARQ-ACK feedback timing information for the PDSCH. Table including the slot information to which the PDSCH is mapped, the start symbol information, the number of symbols, or the length information may have default values. Also, there may be Table that the base station may set in the terminal.

When the terminal is configured with a dynamic HARQ-ACK codebook, a HARQ-ACK feedback bit (or a HARQ-ACK codebook size) to be transmitted by the terminal may be determined by downlink assignment indicator (DAI) information included in DCI of a slot in which HARQ-ACK information is transmitted, according to a value of slot information K0 to which the PDSCH is mapped and a value of HARQ-ACK feedback timing information K1 for the PDSCH.

In the present disclosure, in a situation in which the terminal performs one or more HARQ-ACK transmissions in one slot, one or more physical uplink control channels (PUCCHs) including HARQ-ACK may be transmitted on one slot. In this case, PUCCHs including HARQ-ACK transmitted on one slot and another PUCCH including channel information or scheduling request information may overlap in a specific OFDM symbol. The present disclosure provides an operating method of a terminal for solving a collision between a PUCCH and a PUCCH. Also, PUCCHs transmitted on one slot and a physical uplink shared channel (PUSCH) transmitting UL data information may overlap in a specific OFDM symbol. The present disclosure provides an operating method of a terminal for solving a collision between a PUCCH and a PUSCH.

FIG. 1 is a diagram illustrating a transmission structure of a time-frequency domain that is a radio resource domain in a 5G or NR system, according to an embodiment of the present disclosure.

Referring to FIG. 1, in the radio resource domain, the horizontal axis represents a time domain, and the vertical axis represents a frequency domain. A minimum transmission unit in the time domain is an OFDM symbol, and Nsymb OFDM symbols 102 are gathered to configure one slot 106. A length of a subframe may be defined as 1.0 ms, and a radio frame 114 may be defined as 10 ms. A minimum transmission unit in the frequency domain is a subcarrier, and a total system transmission bandwidth may be configured with a total of NBW subcarriers 104. However, these specific numerical values may be variably applied depending on a system.

A basic unit of a time-frequency resource domain is a resource element (RE) 112, which may be represented by an OFDM symbol index and a subcarrier index. A resource block (RB) 108 or a physical resource block (PRB) may be defined as Nsymb consecutive OFDM symbols 102 in the time domain and NRB consecutive subcarriers 110 in the frequency domain. Therefore, one RB 108 may include Nsymb×NRB REs 112.

In general, a minimum transmission unit of data is an RB unit. In the 5G or NR system, it is general that Nsymb=14, NRB=12, and NBW and NRB may be proportional to a system transmission bandwidth. A data rate increases in proportion to the number of RBs scheduled for a UE. In the 5G or NR system, in the case of a frequency division duplex (FDD) system operating while dividing DL and UL by frequency, a DL transmission bandwidth may be different from a UL transmission bandwidth. A channel bandwidth represents a radio frequency (RF) bandwidth corresponding to the system transmission bandwidth. Table 1 below shows a correspondence between a system transmission bandwidth and a channel bandwidth defined in an LTE system, which is a 4th generation wireless communication before the 5G or NR system. For example, the LTE system with a channel bandwidth of 10 MHz has a transmission bandwidth of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The 5G or NR system may operate in a channel bandwidth wider than the channel bandwidth of the LTE presented in Table 1. Table 2 shows a correspondence between a system transmission bandwidth, a channel bandwidth, and subcarrier spacing (SCS) in the 5G or NR system.

TABLE 2

| | SCS [kHz] | Channel bandwidth $BW_{Channel}$ [MHz] | | | | | | | | | |
|---|---|---|---|---|---|---|---|---|---|---|---|
| | | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information for DL data or UL data is transmitted from the base station to the UE through DCI. The DCI is defined according to various formats. Depending on the formats, the DCI may indicate whether the DCI is scheduling information (UL grant) for UL data or scheduling information (DL grant) for DL data, whether the DCI is a compact DCI with a small size of control information, whether to apply spatial multiplexing using multiple antennas, and whether the DCI is DCI for power control. For example, DCI format 1-1, which is scheduling control information (DL grant) for DL data, may include at least one piece of the following control information.

Carrier indicator: indicates a frequency carrier on which transmission is performed.

DCI format indicator: is an indicator that identifies whether the DCI is for DL or UL.

Bandwidth part (BWP) indicator: indicates a BWP in which transmission is performed.

Frequency domain resource assignment: indicates an RB of a frequency domain allocated for data transmission. A resource to be represented is determined according to the system bandwidth and resource allocation method.

Time domain resource assignment: indicates a slot and an OFDM symbol of the slot, on which a data-related channel is to be transmitted.

VRB-to-PRB mapping: indicates a method of mapping a virtual RB (VRB) index and a physical RB (PRB) index.

Modulation and coding scheme (MCS): indicates a modulation scheme and a coding rate that are used for data transmission. That is, the MCS may indicate a coding rate value capable of notifying of channel coding information and a transport block size (TBS) together with information relating to whether the modulation scheme corresponds to quadrature phase shift keying (QPSK), a 16 quadrature amplitude modulation (QAM), a 64 QAM, or a 256 QAM.

Codeblock group (CBG) transmission information: indicates information relating to which CBG is transmitted when CBG retransmission is configured.

HARQ process number: indicates a process number of HARQ.

New data indicator: indicates whether transmission is HARQ initial transmission or retransmission.

Redundancy version: indicates a redundancy version of HARQ.

Transmit power control (TPC) command for PUCCH: indicates a transmit power control command for PUCCH, which is an UL control channel.

In the case of PUSCH transmission, time domain resource assignment may be transmitted by information about the slot in which the PUSCH is transmitted, the start OFDM symbol position S in the corresponding slot, and the number L of OFDM symbols to which the PUSCH is mapped. S may be a relative position from the start of the slot, L may be the number of consecutive OFDM symbols, and S and L may be determined from a start and length indicator value (SLIV) defined as follows.

If $(L-1) \leq 7$ then $SLIV = 14 \cdot (L-1) + S$ else $SLIV = 14 \cdot (14-L+1) + (14-1-S)$ where $0 < L \leq 14-S$ The 5G or NR system may be configured with Table including information about an SLIV value, a PUSCH mapping type, and a slot in which a PUSCH is transmitted in one row through RRC configuration. Thereafter, in the time domain resource assignment of the DCI, the base station may indicate an index value in the configured table to transmit, to the UE, the information about the SLIV value, the PUSCH mapping type, and the slot in which the PUSCH is transmitted.

In the 5G or NR system, the PUSCH mapping type is defined as type A and type B. In the PUSCH mapping type A, the first OFDM symbol among demodulation reference signal (DMRS) OFDM symbols is located in the second or third OFDM symbol in the slot. In the PUSCH mapping type B, the first OFDM symbol among DMRS OFDM symbols is located in the first OFDM symbol on the time domain resource allocated for PUSCH transmission. The PUSCH time domain resource assignment method may be equally applicable to PDSCH time domain resource assignment.

The DCI may be transmitted over a physical downlink control channel (PDCCH) (hereinafter used interchangeable with control information) through a channel coding and modulation process.

In general, the DCI is independently scrambled by a specific radio network temporary identifier (RNTI) (or a UE identifier) for each UE, so that cyclic redundancy check (CRC) is added thereto, and is channel-coding and then is transmitted by being configured as an independent PDCCH. The PDCCH is transmitted by being mapped in a control resource set (CORESET) configured for the UE.

DL data may be transmitted over a PDSCH, which is a physical channel for DL data transmission. The PDSCH may be transmitted after a control channel transmission interval, and scheduling information such as a specific mapping position and a modulation scheme in the frequency domain is determined based on the DCI transmitted through the PDCCH.

The base station notifies the UE of the modulation scheme applied to the PDSCH to be transmitted and the size of data to be transmitted (hereinafter referred to as TBS) through the MCS among pieces of the control information constituting the DCI. In an embodiment, the MCS may include 5 bits, or more or fewer bits. The TBS corresponds to the size before the channel coding for error correction is applied to data (transport block (TB)) to be transmitted by the base station.

In the present disclosure, the TB may include a MAC header, a MAC CE, one or more MAC service data units (SDUs), and padding bits. Alternatively, the TB may indicate a data unit transmitted from a MAC layer to a physical layer or a MAC protocol data unit (PDU).

The modulation method supported by the 5G or NR system is QPSK, 16QAM, 64QAM, and 256QAM, and each modulation order (Qm) corresponds to 2, 4, 6, and 8. That is, 2 bits per symbol may be transmitted in QPSK modulation, 4 bits per OFDM symbol may be transmitted in 16QAM modulation, 6 bits per symbol may be transmitted in 64QAM modulation, and 8 bits per symbol may be transmitted in 256QAM modulation.

In the 5G or NR system, in case that the UE is scheduled for the PDSCH or the PUSCH by the DCI, when the time resource assignment field index m included in the DCI is indicated, this informs a combination of DMRS type A position information, PDSCH mapping type information, slot index K0, data resource start symbol S, and data resource assignment length L, which correspond to m+1 in Table indicating time domain resource assignment information. As an example, Table 3 is Table including pieces of time domain resource assignment information.

resources. In other words, PDSCH mapping type B does not use dmrs-typeA-Position information.

In Table 3, K0 refers to an offset between a slot index to which the PDCCH through which the DCI is transmitted belongs and a slot index to which the PDSCH or PUSCH scheduled in the DCI belongs. For example, when the slot index of the PDCCH is n, the slot index of the PDSCH or PUSCH scheduled by the DCI of the PDCCH is n+K0. In Table 3, S refers to a start symbol index of the data time domain resource within one slot. The range of available S values is usually 0 to 13 on a normal CP basis. In Table 3, L refers to a data time domain resource interval length within one slot. The range of available L values is 1 to 14. However, the available S and L values are determined by Equation 1 and Table 4 or Table 5 to be described below. Table 3 may be values used as default by the UE before receiving time resource assignment information by UE-specific or UE-common higher layer signaling. As an example, DCI format 0_0 or 1_0 may always use Table 3 as default time resource domain values.

Table 3 shows PDSCH time domain resource assignment values. For PUSCH time domain resource assignment, K1 is used instead of K2. Table 4 below is an example of a PUSCH time domain resource assignment table.

TABLE 3

PDSCH time domain resource assignment based on normal CP

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position at which a DMRS is transmitted on one slot indicated by a system information block (SIB), which is one of pieces of UE common control information. The value of the field may be 2 or 3. When the number of symbols constituting one slot is 14 and the first symbol index is 0, 2 refers to the third symbol and 3 refers to the fourth symbol. In Table 3, PDSCH mapping type is information indicating the location of the DMRS in the scheduled data resource domain. When PDSCH mapping type is A, the DMRS is always transmitted and received at the symbol position determined in dmrs-typeA-Position regardless of the allocated data time domain resource. When PDSCH mapping type is B, the DMRS is always transmitted and received in the first symbol among the allocated data time domain

TABLE 4

PDSCH time domain resource assignment based on normal CP

| Row Index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

If $(L-1) \leq 7$ then $$SLIV = 14 \cdot (L-1) + S$$

else $$SLIV = 14 \cdot (14-L+1) + (14-1-S)$$

where $0 < L \leq 14-S$      Equation 1

Table 5 below shows available combinations of S and L according to whether the CP is a normal CP or an extended CP and whether the PDSCH mapping type is type A or type B.

TABLE 5

| | PDSCH time domain resource assignable combination of S and L | | | | | |
|---|---|---|---|---|---|---|
| PDSCH | Normal cyclic prefix | | | Extended cyclic prefix | | |
| mapping type | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

(Note 1):
S = 3 is applicable only if dmrs − TypeA − Position = 3

Table 6 below shows available combinations of S and L according to whether the CP is a normal CP or an extended CP and whether the PUSCH mapping type is type A or type B.

TABLE 6

| | PUSCH time domain resource assignable combination of S and L | | | | | |
|---|---|---|---|---|---|---|
| PUSCH | Normal cyclic prefix | | | Extended cyclic prefix | | |
| mapping type | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

In Table 6, each index may be set through a higher layer signaling parameter PDSCH-TimeDomainResourceAllocationList or PUSCH-TimeDomainResourceAllocationList.

PDSCH-TimeDomainResourceAllocationList includes one or more higher layer signaling parameters PDSCH-TimeDomainResourceAllocation, and PDSCH-TimeDomainResourceAllocation includes k0, mappingtype, and startSymbolAndLength. The available value range of k0 is 0 to 32. Mappingtype may correspond to type A or type B. The available value range of StartSymbolAndLength is 0 to 127. As described above, when mappingtype is type A, the symbol position of the DMRS follows a value indicated by dmrs-typeA-Position.

PUSCH-TimeDomainResourceAllocationList includes one or more higher layer signaling parameters PUSCH-TimeDomainResourceAllocation, and PUSCH-TimeDomainResourceAllocation includes k0, mapping type, and startSymbolAndLength. The available value range of k0 is 0 to 32. Mappingtype may correspond to type A or type B. The available value range of StartSymbolAndLength is 0 to 127. As described above, when mappingtype is type A, the symbol position of the DMRS follows a value indicated by dmrs-typeA-Position.

PDSCH-TimeDomainResourceAllocation or PUSCH-TimeDomainResource Allocation described above is a method of allocating PDSCH or PUSCH time domain resources within one slot. The higher layer signaling aggregationFactorDL refers to the number of slots in which a PDSCH-TimeDomainResourceAllocation value applied to one slot is repeatedly transmitted. The higher layer signaling aggregationFactorUL refers to the number of slots in which a PUSCH-TimeDomainResourceAllocation value applied to one slot is repeatedly transmitted. The available value range of aggregationFactorDL and aggregationFactorUL is {1, 2, 4, 8}. For example, when aggregationFactorDL is 8, it means that one value of available PDSCH-TimeDomainResourceAllocations is repeatedly transmitted over a total of eight slots. However, when at least some symbols applied to PDSCH-TimeDomainResourceAllocation in a specific slot are UL symbols, PDSCH transmission and reception in the corresponding slot is omitted. Similarly, when at least some symbols applied to PUSCH-TimeDomainResourceAllocation in a specific slot are DL symbols, PUSCH transmission and reception in the corresponding slot is omitted.

Next, the PUCCH will be described. First, a long PUCCH will be described. A control channel of a long transmission interval is used to increase cell coverage, and thus, may be transmitted through a DFT-S-OFDM scheme for short carrier transmission rather than OFDM transmission. Accordingly, at this time, a UL control channel should be transmitted by using only consecutive subcarriers, and frequency hopping may be set in order to obtain a frequency diversity effect. That is, when frequency hopping is applied (when frequency hopping is enabled with a higher layer signal), a UL control channel of a long transmission interval may be configured at a location where frequency resources are separated from each other. When frequency hopping is not applied (when frequency hopping is disabled with a higher layer signal), transmission start PRB information and PRB number information set in the higher layer signal may be transmitted during a transmission symbol interval of a long PUCCH at a frequency location.

In terms of frequency, a distance where frequency resources are separated from each other may be less than a bandwidth supported by the UE. Also, in the front part of the slot, the UL control channel is transmitted by using PRB-1, which is the transmission start PRB set in the higher layer signal. In the latter part of the slot, when hopping is configured, the UL control channel is transmitted by using PRB-2 spaced apart from PRB-1 as much as a frequency resource for frequency hopping. The PRB is a physical resource block, which refers to a minimum transmission unit on the frequency domain, and may be defined as 12 subcarriers. Accordingly, a frequency-domain distance between PRB-1 and PRB-2 should be less than a maximum supported bandwidth of the UE, and the maximum supported bandwidth of the UE may be equal to or less than a bandwidth supported by the system.

A long PUCCH supports transmission formats such as PUCCH format 1, PUCCH format 3, and PUCCH format 4 according to the number of supportable control information bits and whether UE multiplexing is supported through pre-discrete Fourier transform (Pre-DFT) orthogonal cover code (OCC) support in the front end of inverse fast Fourier transform (IFFT). First, PUCCH format 1 is a DFT-S-OFDM-based long PUCCH format capable of supporting up to 2 bits of control information. The control information included in PUCCH format 1 may include each or a combination of HARQ-ACK and scheduling request (SR). In PUCCH format 1, an OFDM symbol including a DMRS (or a reference signal) and an OFDM symbol including uplink control information (UCI) are repeatedly configured. For example, when the number of transmission symbols in PUCCH format 1 is eight symbols, the eight symbols include a DMRS symbol, a UCI symbol, a DMRS symbol, a UCI symbol, a DMRS symbol, a UCI symbol, a DMRS symbol, and a UCI symbol in sequence from the first symbol.

The DMRS symbol has a structure that is spread by using an orthogonal code (or orthogonal sequence or spreading code, w_i(m)) on the time domain for a sequence corresponding to a length of 1 RB on the frequency domain within one OFDM symbol, and is transmitted after IFFT is performed. The UCI symbol has a structure that generates d(0) by modulating 1-bit control information with BPSK and 2-bit control information with QPSK, scrambles a sequence by multiplying the generated d(0) by the sequence corresponding to a length of 1 RB on the frequency domain, is spread by using an orthogonal code (or orthogonal sequence or spreading code, w_i(m)) for the scramble sequence on the time domain, and is transmitted after IFFT is performed. The UE generates a sequence based on the configured ID and group hopping or sequence hopping configuration set by the higher layer signal from the base station, and generates a sequence corresponding to a length of 1 RB by cyclic shifting the generated sequence with an initial cyclic shift (CS) value set by the higher layer signal.

w_i(m) is given as Table 7 below according to the length $((N_{SF}))$ of the spreading code. i represents the index of the spreading code itself, and m represents the indices of elements of the spreading code. The numbers in [ ] in Table 7 refers to $\varphi(m)$. When the length of the spreading code is 0 and the index i of the set spreading code is 0, the spreading code $w_i(m)$ becomes and $w_i(0)=e^{j2\pi \cdot 0/N_{SF}}=1$, $w_i(1)=e^{j2\pi \cdot 0/N_{SF}}=1$, and thus, w_i(m)=[1 1].

in Table 8 below according to whether frequency hopping is performed and whether an additional DMRS symbol is configured.

TABLE 8

| PUCCH format 3/4 transmission length | DMRS position in PUCCH format 3/4 transmission | | | |
|---|---|---|---|---|
| | additional DMRS is not configured | | additional DMRS is configured | |
| | Frequency hopping is not configured | Frequency hopping is configured | Frequency hopping is not configured | Frequency hopping is configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

When the number of transmission symbols in PUCCH format 3 is eight symbols, DMRS is transmitted to the first symbol and the fifth symbol by starting the first start symbol of the eight symbols with 0. The above table is also applied to the DMRS symbol position of PUCCH format 4 in the same manner.

Next, PUCCH format 4 is a DFT-S-OFDM-based long PUCCH format capable of supporting more than 2 bits of control information. The control information included in PUCCH format 4 may include HARQ-ACK, channel state information (CSI), and SR alone or in combination. PUCCH format 4 differs from PUCCH format 3 in that PUCCH format 4 of multiple UEs may be multiplexed within one RB. It is possible to multiplex PUCCH format 4 of multiple UEs by applying Pre-DFT OCC to control information in the front end of IFFT. However, the number of transmittable control information symbols of one UE is reduced according to the number of UEs to be multiplexed.

Next, a short PUCCH will be described. The short PUCCH may be transmitted on both the DL center slot and the UL center slot. In general, the short PUCCH is trans-

TABLE 7

Spreading code for PUCCH format 1

| | $\varphi(m)$ | | | | | | |
|---|---|---|---|---|---|---|---|
| $N_{SF}$ | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, PUCCH format 3 is a DFT-S-OFDM-based long PUCCH format capable of supporting more than 2 bits of control information. The control information included in PUCCH format 3 may include each of a combination of HARQ-ACK, channel state information (CSI), and SR. In PUCCH format 3, the DMRS symbol position is presented mitted in the last symbol of the slot or the OFDM symbol in the latter part (e.g., the last OFDM symbol, the second to last OFDM symbol, or the last two OFDM symbols). Of course, it is also possible to transmit the short PUCCH at any position within the slot. The short PUCCH may be transmitted by using one OFDM symbol or two OFDM symbols. Radio resources for the short PUCCH are allocated in units of PRBs on the frequency domain. One PRB or a plurality of consecutive PRBs may be allocated. Alternatively, a plurality of PRBs spaced apart in a frequency band may be allocated. The allocated PRBs have to be included in the same or smaller band than the frequency band supported by the UE. In one PRB, the UL control information and the DMRS may have to be multiplexed in the frequency band. A multiplexing mapping for multiplexing the UL control information and the DMRS may be defined in the standard. The UE transmits the short PUCCH according to the multiplexing mapping method defined in the standard, and the base station demodulates the short PUCCH according to the multiplexing mapping method defined in the standard. Alternatively, the UE multiplexes and transmits the DMRS and the UL control information according to a method indicated through the reception of the higher layer signal. Alternatively, a method of transmitting the DMRS may be determined according to the number of bits of the UL control information. When the number of bits of the UL control information is great, it may be necessary to use many resources for transmission of UL control information in order to lower a transmission code rate.

The short PUCCH supports transmission formats such as PUCCH format 0 and PUCCH format 2 according to the number of supportable control information bits. First, PUCCH format 0 is a CP-S-OFDM-based short PUCCH format capable of supporting up to 2 bits of control information. The control information included in PUCCH format 0 may include each or a combination of HARQ-ACK and SR. PUCCH format 0 has a structure in which only a sequence mapped to 12 subcarriers is transmitted on the frequency domain within one OFDM symbol without transmitting DMRS. The UE generates a sequence based on the configured ID and the group hopping or sequence hopping configuration set by the higher layer signal from the base station. As a final CS value obtained by adding different CS values to the indicated initial CS value according to ACK or NACK, the generated sequence is cyclic shifted and transmitted by being mapped to 12 subcarriers. When HARQ-ACK is 1 bit, as shown in Table 9 below, in case of ACK, 6 is added to the initial CS value to generate the final CS, and in case of NACK, 0 is added to the initial CS to generate the final CS. 0 that is the CS value for NACK and 6 that is the CS value for ACK are defined in the standard, and the UE always generates PUCCH format 0 according to the value defined in the standard and transmits 1-bit HARQ-ACK.

TABLE 9

| 1-bit HARQ-ACK | NACK | ACK |
| --- | --- | --- |
| Final CS | (initial CS + 0) mod 12 = inital CS | (initial CS + 6) mod 12 |

When HARQ-ACK is 2 bits, as shown in Table 10 below, in case that the 2-bit HARQ-ACK is (NACK, NACK), 0 is added to the initial CS value, in case that the 2-bit HARQ-ACK is (NACK, ACK), 3 is added to the initial CS value, in case that the 2-bit HARQ-ACK is (ACK, ACK), 6 is added to the initial CS value, and in case that the 2-bit HARQ-ACK is (ACK, NACK), 9 is added to the initial CS value. 0 that is the CS value for (NACK, NACK), 3 that is the CS value for (NACK, ACK), 9 that is the CS value for (ACK, ACK), and 9 that is the CS value for (ACK, NACK) are defined in the standard, and the UE always generates PUCCH format 0 according to the value defined in the standard and transmits 2-bit HARQ-ACK.

When the final CS value is greater than 12 due to the CS value added to the initial CS value according to ACK or NACK, modulo 12 is applied because the length of the sequence is 12.

TABLE 10

| 2-bit HARQ-ACK | NACK, NACK | NACK, ACK | ACK, ACK | ACK, NACK |
| --- | --- | --- | --- | --- |
| Final CS | (initial CS + 0) mod 12 = initial CS | (initial CS + 3) mod 12 | (initial CS + 6) mod 12 | (initial CS + 9) mod 12 |

Next, PUCCH format 2 is a CP-S-OFDM-based short PUCCH format capable of supporting more than 2 bits of control information. The control information included in PUCCH format 2 may include each or a combination of HARQ-ACK, CSI, and SR. In PUCCH format 2, when the index of the first subcarrier is #0, the position of the subcarrier on which the DMRS is transmitted within one OFDM symbol is fixed to the subcarriers having indices #1, #4, #7, and #10. The control information is mapped to the remaining subcarriers except for the subcarrier in which the DMRS is located through a modulation process after channel encoding.

Hereinafter, a method, performed by the UE, of selecting one PUCCH format from among the short PUCCH format and the long PUCCH format and transmitting control information, according to an embodiment of the present disclosure, will be described.

The UE is configured with PUCCH resource sets as higher layer signals. The UE selects the configured PUCCH resource sets according to the number of control information bits. When the number of control information bits to be transmitted on a specific slot is 1 or 2, the UE selects PUCCH resource set 0. When the number of control information bits to be transmitted is 3 to N2-1, the UE selects PUCCH resource set 1. When the number of control information bits to be transmitted is N2 to N3-1, the UE selects PUCCH resource set 2. When the number of control information bits to be transmitted is N3 to N4-1, the UE selects PUCCH resource set 3. N2, N3, and N4 are all higher layer signals, and the UE may receive N2, N3, and N4 from the base station in advance.

Each of the PUCCH resource sets includes X PUCCH resources. The X PUCCH resources include a resource for short PUCCH (PUCCH format 0, PUCCH format 2) or a resource for long PUCCH (PUCCH format 1, PUCCH format 3, PUCCH format 4). That is, each of the configured PUCCH resources may include all pieces of information necessary to transmit a specific PUCCH format (PUCCH format 0, PUCCH format 1, PUCCH format 2, PUCCH format 3, or PUCCH format 4), and each of the PUCCH resources may be configured to transmit different PUCCH formats. X is a constant, and X may be set as a different higher layer signal for each PUCCH resource set. For example, PUCCH resource set 0 may include X (=32) PUCCH resources, and the remaining PUCCH resource sets 1, 2, and 3 may include X (=8) PUCCH resources.

The UE selects a certain resource from among the X resources, and whether to transmit a PUCCH format corresponding to the selected resource may be indicated through the bit of the DL control channel, and may be determined (derived) through a transmission resource or a slot index of the DL control channel, a UE identifier (ID), and the like. Alternatively, the indication through the DL control channel and the determining (deriving) method through the transmission resource or slot index of the DL control channel, the UE ID, and the like may be mixed and indicated to the UE.

The UE selects a certain resource from among the X resources, and whether to transmit a PUCCH format corresponding to the selected resource is indicated or determined (derived). The UE selects one PUCCH resource from the X PUCCH resources and transmits control information through the corresponding PUCCH format. Like HARQ-ACK transmission, the PUCCH resource indication method described above may be applied only when it is possible for the UE to determine the PUCCH resource through the reception of the corresponding DL control channel before HARQ-ACK transmission. Like CSI or SR transmission, when the UE does not receive the corresponding DL control channel before CSI or SR, the UE may receive the PUCCH format and necessary PUCCH resource, which the UE should use to transmit CSI or SR, from the base station through a higher layer signal in advance. According to the period and offset set by the higher layer signal from the base station, the UE transmits CSI or SR by using the configured PUCCH format in the configured PUCCH resource included in the slot for CSI or SR transmission.

Each PUCCH resource corresponding to the configured PUCCH format includes at least one piece of the following information.

PUCCH transmission start symbol, number of PUCCH transmission symbols

When index indicating start PRB, number of transmission PRBs, whether frequency hopping is configured, and frequency hopping is indicated, frequency resource of the second hop is supported Initial CS value, time domain OCC index, Pre-DFT OCC length, Pre-DFT OCC index The range of information and values required for each PUCCH format may be summarized in Table 11 as follows. In Table 11 below, N.A. represents the case where the value does not need to be set, or the case where the value range is not required because the value is 1.

2, and the long PUCCH indicates PUCCH format 1, PUCCH format 3, or PUCCH format 4. Also, in the present disclosure, unless specifically specified, transmission in PUCCH format X means transmitting a specific PUCCH format corresponding to the PUCCH resource by using the PUCCH resource obtained through the method of the present disclosure, such as indicating or deriving from the base station.

Next, the DCI in the 5G system will be described in detail.

In the 5G system, scheduling information for UL data (or PUSCH) or DL data (or PDSCH) is transmitted from the base station to the UE through the DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be transmitted over a PDCCH through a channel coding and modulation process. A CRC is attached to a DCI message payload. The CRC is scrambled by a RNTI corresponding to the identity of the UE. Different RNTIs may be used according to the purpose of the DCI message, for example, UE-specific data transmission, a power control command, or a random access response. That is, the RNTI is not explicitly transmitted, but is transmitted by being included in a CRC calculation process. When the DCI message transmitted over the PDCCH is received, the UE checks the CRC by using the assigned RNTI. When a result of checking the CRC is correct, the UE may know that the DCI message has been transmitted to the UE.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies transmit power control (TPC) may be scrambled by a

TABLE 11

| | | PUCCH Format 0 | PUCCH Format 1 | PUCCH Format 2 | PUCCH Format 3 | PUCCH Format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling a FH | Configurability | √ | √ | √ | √ | √ |
| | Value range | On/Off (only for 2 symbol) | On/Off | On/Off (only for 2 symbol) | On/Off | On/Off |
| Freq. cy resource of $2^{nd}$ hop if FH is enabled | Configurability | √ | √ | √ | √ | √ |
| | Value range | 0-274 | 0-274 | 0-274 | 0-274 | 0-274 |
| Index of initial cyclic shift | Configurability | √ | √ | N.A. | N.A. | N.A. |
| | Value range | 0-11 | 0-11 | N.A. | 0-11 | 0-11 |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

In the present disclosure, unless specifically specified, the short PUCCH indicates PUCCH format 0 or PUCCH format TPC-RNTI. DCI that schedules a UE-specific PDSCH or PUSCH may be scrambled by a cell RNTI (C-RNTI).

DCI format 0_0 may be used as a fallback DCI that schedules a PUSCH. In this case, a CRC may be scrambled by a C-RNTI. DCI format 0_0 in which the CRC is scrambled by the C-RNTI may include, for example, pieces of information shown in Table 12 below.

TABLE 12

- Identifier for DCI formats - [1] bit
- Frequency domain resource assignment -
  $\lceil \log_2 (N_{RB}^{UL,\ BWP} (N_{RB}^{UL,\ BWP} +1)/2) \rceil$ ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled
PUSCH command - [2] bits
- UL/supplementary UL (SUL)
indicator - 0 or 1 bit DCI format 01 may be used as a non-fallback DCI that schedules a PUSCH. In this case, a CRC may be scrambled by a C-RNTI. DCI format 0_1 in which the CRC is scrambled by the C-RNTI may include, for example, pieces of information shown in Table 13 below.

TABLE 13

- Carrier indicator − 0 or 3 bits
- UL/SUL indicator − 0 or 1 bit
- Identifier for DCI formats − [1] bits
- Bandwidth part indicator − 0, 1 or 2 bits
- Frequency domain resource assignment
  • For resource allocation type 0, $\lceil N_{RB}^{UL,BWP} / P \rceil$ bits
  • For resource allocation type 1, $\lceil \log_2(N_{RB}^{UL,BWP}(N_{RB}^{UL,BWP} + 1)/2 \rceil$ bits
- Time domain resource assignment −1, 2, 3, or 4 bits
- Virtual resource block-to-Physical resource block (VRB-to-PRB) mapping − 0 or 1 bit, only for resource allocation type 1.
  • 0 bit if only resource allocation type 0 is configured;
  • 1 bit otherwise.
- Frequency hopping flag − 0 or 1 bit, only for resource allocation type 1.
  • 0 bit if only resource allocation type 0 is configured;
  • 1 bit otherwise.
- Modulation and coding scheme − 5 bits
- New data indicator − 1 bit
- Redundancy version − 2 bits
- HARQ process number − 4 bits
- 1st downlink assignment index − 1 or 2 bits
  • 1 bit for semi-static HARQ-ACK codebook;
  • 2 bits for dynamic HARQ-ACK codebook with single HARQ-ACK codebook.
- 2nd downlink assignment index − 0 or 2 bits
  • 2 bits for dynamic HARQ-ACK codebook with two HARQ-ACK sub-codebooks;
  • 0 bit otherwise
- TPC command for scheduled PUSCH − 2 bits
- SRS resource indicator − $\left\lceil \log_2\left(\sum_{k=1}^{L_{max}} \binom{N_{SRS}}{k}\right) \right\rceil$ or $\lceil \log_2(N_{SRS}) \rceil$ bits

• $\left\lceil \log_2\left(\sum_{k=1}^{L_{max}} \binom{N_{SRS}}{k}\right) \right\rceil$ bits for non-codebook based PUSCH transmission;

• $\lceil \log_2(N_{SRS}) \rceil$ bits for codebook based PUSCH transmission.
- Precoding information and number of layers − up to 6 bits
- Antenna ports − up to 5 bits
- SRS request − 2 bits
- CSI request − 0, 1, 2, 3, 4, 5, or 6 bits TABLE 13-continued

- Code block group (CBG) transmission information − 0, 2, 4, 6, or 8 bits
- Phase tracking reference signal (PTRS)-demodulation reference signal (DMRS) association − 0 or 2 bits
- beta_offset indicator − 0 or 2 bits
- DMRS sequence initialization − 0 or 1 bit DCI format 1_0 may be used as a fallback DCI that schedules a PDSCH. In this case, a CRC may be scrambled by a C-RNTI. DCI format 1_0 in which the CRC is scrambled by the C-RNTI may include, for example, pieces of information shown in Table 14 below.

TABLE 14

- Identifier for DCI formats - [1] bit
- Frequency domain resource assignment -
  $\lceil \log_2 (N_{RB}^{DL,\ BWP} (N_{RB}^{DL,\ BWP} +1)/2) \rceil$ ] bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits DCI format 1_1 may be used as a non-fallback DCI that schedules a PDSCH. In this case, a CRC may be scrambled by a C-RNTI. DCI format 1_1 in which the CRC is scrambled by the C-RNTI may include, for example, pieces of the following information.

TABLE 15

```
- Carrier indicator - 0 or 3 bits
- Identifier for DCI formats - [1] bits
- Bandwidth part indicator - 0, 1 or 2 bits
- Frequency domain resource assignment
    • For resource allocation type 0,
    ⌈N_RB^DL, BWP / P⌉ bits
    • For resource allocation type 1,
    ⌈log₂ (N_RB^DL, BWP (N_RB^DL, BWP +1) / 2)⌉ bits
  - Time domain resource
  assignment - 1, 2, 3, or 4 bits
  - VRB-to-PRB mapping - 0 or 1 bit,
  only for resource allocation type 1.
    • 0 bit if only resource allocation
    type 0 is configured;
    • 1 bit otherwise.
  - Physical resource block (PRB)
  bundling size indicator - 0 or 1 bit
  - Rate matching indicator - 0, 1, or 2 bits
  - Zero power (ZP) channel state information
  (CSI)-reference signal (RS)
  trigger - 0, 1, or 2 bits
  For transport block 1:
    - Modulation and coding scheme - 5 bits
    - New data indicator - 1 bit
    - Redundancy version - 2 bits
  For transport block 2:
    - Modulation and coding scheme - 5 bits
    - New data indicator - 1 bit
    - Redundancy version - 2 bits
  - HARQ process number - 4 bits
  - Downlink assignment index - 0 or 2 or 4 bits
  - TPC command for scheduled PUCCH - 2 bits
  - PUCCH resource indicator - 3 bits
  - PDSCH-to-HARQ_feedback timing indicator - 3 bits
  - Antenna ports - 4, 5 or 6 bits
  - Transmission configuration
  indication - 0 or 3 bits
```

TABLE 15-continued

```
- SRS request - 2 bits
- CBG transmission
information - 0, 2, 4, 6, or 8 bits
- Code block group (CBG) flushing
out information - 0 or 1 bit
- DMRS sequence initialization - 1 bit
```

DCI format 0_0 and DCI format 1_0, and DCI format 2_2 and DCI format 2_3 to be described below have the same DCI message payload size (A). DCI format 0_1 and DCI format 1_1, and DCI format 2_0 and DCI format 2_1 to be described below may have DCI message payload sizes that are set differently from the base station. That is, when the DCI message payload size of DCI format 0_1 is B, the DCI message payload size of DCI format 1_1 is C, the DCI message payload size of DCI format 2_0 is D, and the DCI message payload size of DCI format 2_1 is E, A, B, C, D, and E may all be set differently. Accordingly, the UE may monitor DCI formats on the assumption of up to five different DCI message payload sizes A, B, C, D, and E.

Hereinafter, the DL control channel in the 5G communication system will be described in more detail with reference to the drawings.

Figure 2:
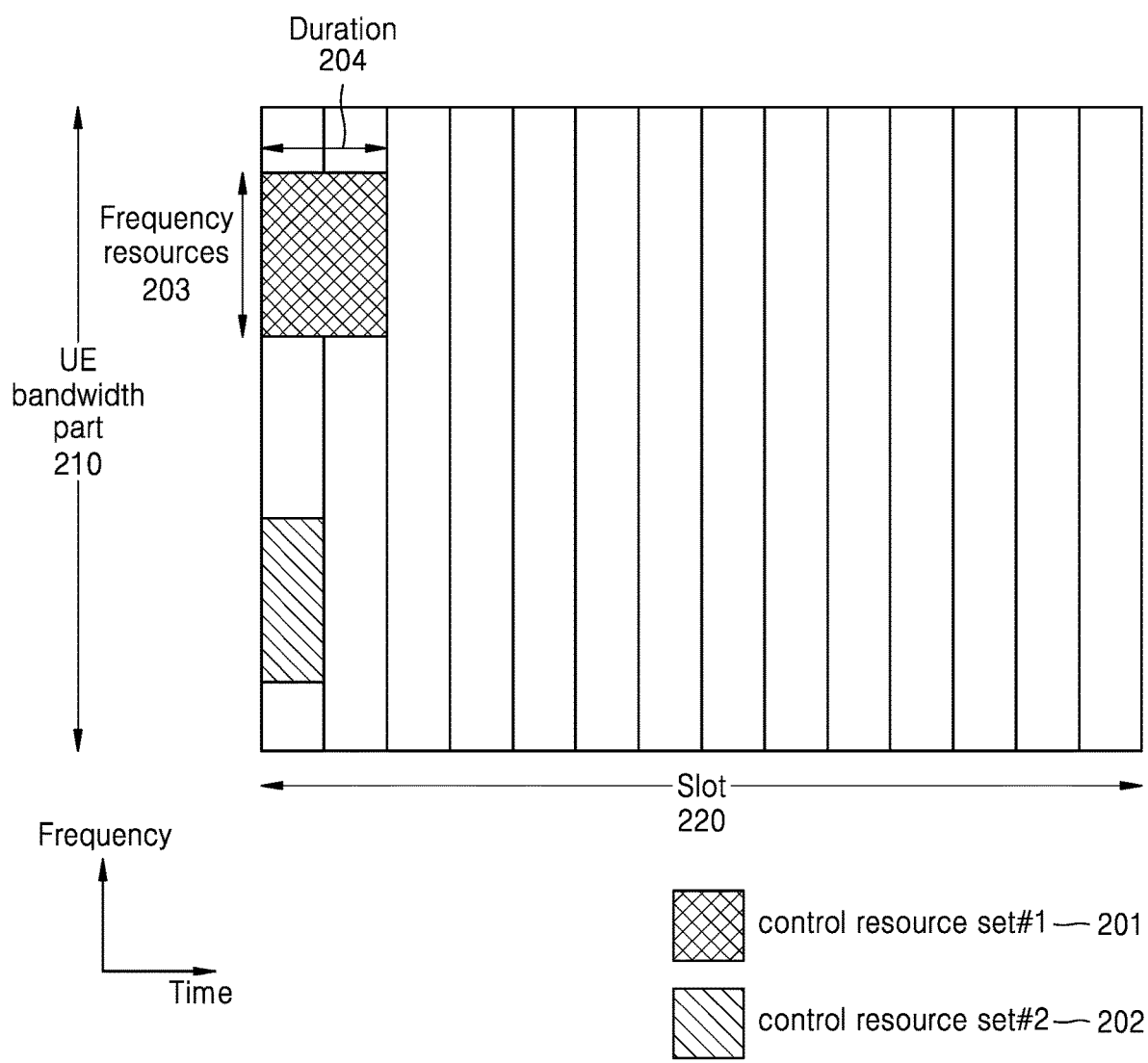
FIG. 2 is a diagram for describing a method of allocating a plurality of pieces of data for enhanced mobile broadband (eMBB), ultra-reliable and low-latency communications (URLLC), and massive machine type communications (mMTC) in a time-frequency resource domain in a 5G or NR system, according to an embodiment of the present disclosure.

FIG. 2 is a diagram illustrating an example of a control resource set (CORESET or Coreset) in which a DL control channel is transmitted in a 5G wireless communication system, according to an embodiment of the present disclosure.

FIG. 2 illustrates an example in which a UE bandwidth part 210 is configured on a frequency domain, and two control resource sets (control resource set #1 201 and control resource set #2 202) are configured in one slot 220 on a time domain. The control resource sets 201 and 202 may be configured on a specific frequency resource 203 within the entire UE bandwidth part 210 on the frequency domain. One or more OFDM symbols may be configured on the time domain and may be defined as a control resource set duration 204. In the example of FIG. 2, the control resource set #1 201 is configured with a control resource set duration of two symbols, and the control resource set #2 202 is configured with a control resource set duration of one symbol.

The base station may configure the control resource set of the 5G to the UE through higher layer signaling (e.g., SI, master information block (MIB), or RRC signaling). Configuring the control resource set to the UE may mean providing information such as a control resource set identity, a frequency position of the control resource set, a symbol duration of the control resource set, and the like. For example, the control resource set configuration information may include pieces of information shown in Table 16 below.

TABLE 16

```
ControlResourceSet ::=                    SEQUENCE {
    -- Corresponds to L1 parameter 'CORESET-ID'
    controlResourceSetId                  ControlResourceSetId,
    (control resource set identity)
    frequencyDomainResources              BIT STRING (SIZE (45)),
    (frequency domain resource assignment information)
    duration                              INTEGER (1 ..maxCoReSetDuration),
    (time domain resource assignment information)
    cce-REG-MappingType                   CHOICE {
    (CCE-to-REG mapping type)
        interleaved                       SEQUENCE {
            reg-BundleSize                ENUMERATED {n2, n3, n6},
            (REG bundle size)
            precoderGranularity           ENUMERATED {sameAsREG-bundle,
            allContiguousRBs},
            interleaverSize               ENUMERATED {n2, n3, n6}
            (interleaver size)
            shiftIndex
INTEGER(0..maxNrofPhysicalResourceBlocks-1)
OPTIONAL
            (interleaver shift)
        },
        nonInterleaved                    NULL
    },
    tci-StatesPDCCH                       SEQUENCE(SIZE (1 ..maxNrofTCI-
        StatesPDCCH)) OF TCI-StateId          OPTIONAL,
    (QCL configuration information)
    tci-PresentInDCI                      ENUMERATED
        {enabled}                             OPTIONAL, -- Need
        S
}
``` tci-StatesPDCCH (simply referred to as TCI state) configuration information in Table 16 may include information of one or more synchronization signal (SS)/physical broadcast channel (PBCH) block index or CSI-RS index in quasi co-located (QCL) relationship with DMRS transmitted in the corresponding control resource set.

Next, multi-TRP transmission will be described.

Rel-15 NR supports PDSCH transmission from a single cell/transmission point/panel/beam (hereinafter referred to as a transmission reception point (TRP)) or coherent PDSCH transmission for multiple TRPs. Also, as a HARQ-ACK transmission method optimized therefor, at most one PUCCH resource for HARQ-ACK is transmitted within one slot.

On the other hand, Rel-16 supports non-coherent transmission, that is, non-coherent joint transmission (NC-JT) for each TRP. At this time, each TRP participating in NC-JT may transmit a separate PDSCH to the UE at the same time. HARQ-ACK information for PDSCHs may be transmitted through one PUCCH resource. Considering the case in which overhead due to information exchange between TRPs becomes a burden, such as the case in which the backhaul delay time for each TRP is long, HARQ-ACK information may be transmitted through a separate PUCCH resource for each TRP. In particular, when the UE transmits HARQ-ACK information (or UCI information) on a separate PUCCH resource for HARQ-ACK transmission for each TRP, HARQ-ACK information may be time-division-multiplexed (TDMed) within a slot and then transmitted. At this time, when an overlap between PUCCH resources transmitting HARQ-ACK information for each TRP occurs, the UE transmits HARQ-ACK information for each TRP through one PUCCH. However, the UE determines the order of HARQ-ACK information for each TRP in advance, or receives the order of HARQ-ACK information for each TRP through a higher layer signal. The UE may substitute NACK when there is no PDSCH in a specific TRP. In this manner, HARQ-ACK information may be exchanged between the TRPs and the UE.

The UE may determine that data transmission and reception from multi-TRP is configured for the UE when information of different TRPs is mapped to each coreset through TRP information in the coreset configuration of the PDCCH configured for the UE through the higher layer signal. Alternatively, the UE may determine that data transmission and reception from multi-TRP is configured by determining that a transmission configuration indication state (TCI-State) field of the PDCCH indicating the QCL relationship is mapped to two or more TCI state values by the higher layer signal or a combination of higher layer signals.

Figure 3:
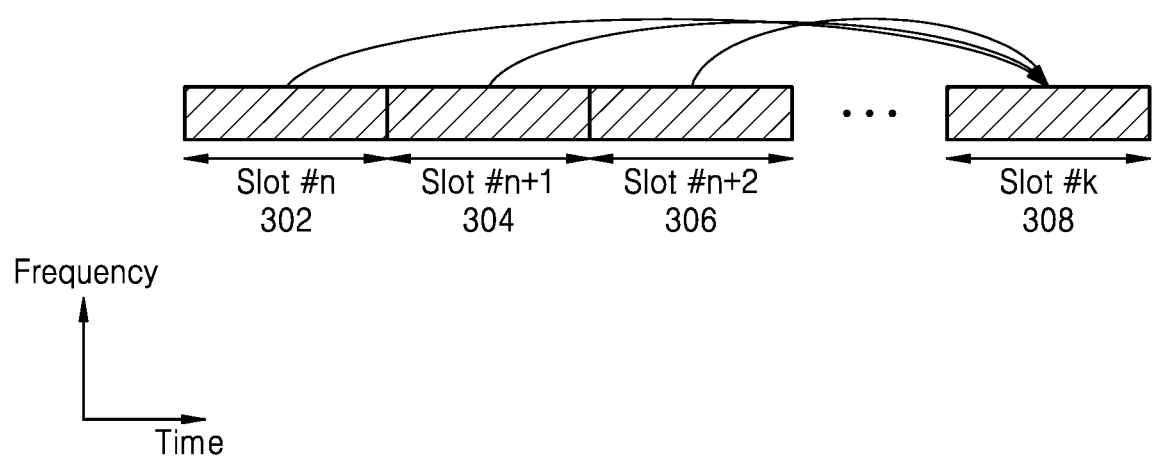
FIG. 3 is a diagram illustrating a method of configuring a semi-static hybrid automatic repeat request-acknowledgment (HARQ-ACK) codebook in an NR system, according to an embodiment of the present disclosure.

FIG. 3 is a diagram illustrating a method of configuring a semi-static HARQ-ACK codebook in an NR system, according to an embodiment of the present disclosure.

In a situation where the number of HARQ-ACK PUCCHs transmittable by the UE within one slot is limited to one, when the UE receives a semi-static HARQ-ACK codebook higher layer configuration, the UE reports HARQ-ACK information for PDSCH reception or SPS PDSCH release in a HARQ-ACK codebook in a slot indicated by a value of a PDSCH-to-HARQ_feedback timing indicator in DCI format 1_0 or DCI format 1_1. In a slot that is not indicated by a PDSCH-to-HARQ_feedback timing indicator field in DCI format 1_0 or DCI format 1_1, the UE reports a HARQ-ACK information bit value in a HARQ-ACK codebook as NACK. When the UE reports only HARQ-ACK information for one SPS PDSCH release or one PDSCH reception in $M_{A,C}$ cases for candidate PDSCH reception and the report of the UE is scheduled by DCI format 1_0 including information indicating that a counter DCI field is 1 in a Pcell, the UE may determine one HARQ-ACK codebook for the SPS PDSCH release or the PDSCH reception.

Other than the above case, an HARQ-ACK codebook determination method according to methods to be described below is employed.

When a set of PDSCH reception candidate occasions in a serving cell c is $M_{A,C}$, $M_{A,C}$ may be obtained through the [pseudo-code 1] stages below.

[start of pseudo-code 1]
stage 1: initializing j to 0, and initializing $M_{A,C}$ to an empty set. Initializing k, which is an HARQ-ACK transmission timing index, to 0.
stage 2: configuring R as a set of rows of Table including information of a slot to which a PDSCH is mapped, start symbol information, and information of the number or length of symbols. When a PDSCH-available mapping symbol indicated by a value of R is configured to a UL symbol according to DL and UL configurations configured at a higher level, removing a corresponding row from R.
stage 3-1: receiving, by the UE, one unicast PDSCH in one slot, and when R is not an empty set, adding one unicast PDSCH to set $M_{A,C}$.
stage 3-2: when the UE is able to receive two or more unicast PDSCHs in one slot, counting the number of PDSCHs allocatable in different symbols from the calculated R, and adding the counted number of PDSCHs to $M_{A,C}$.
stage 4: increasing k by 1 and restarting from step 2.
[end of pseudo-code 1]

In pseudo-code 1, referring to FIG. 3 as an example, in order to perform HARQ-ACK PUCCH transmission at slot #k 308, all slot candidates available for PDSCH-to-HARQ-ACK timing capable of indicating slot #k 308 are considered. In FIG. 3, it is assumed that HARQ-ACK transmission is possible at slot #k 308 by a PDSCH-to-HARQ-ACK timing combination available only for PDSCHs scheduled at slot #n 302, slot #n+1 304, and slot #n+2 306. In consideration of time domain resource configuration information of PDSCH available for scheduling at each of slots 302, 304, and 306 and information indicating whether a symbol within a slot is for DL or UL, the number of PDSCHs available for maximum scheduling for each slot is derived. For example, when two PDSCHs in slot 302, three PDSCHs in slot 304, and two PDSCHs in slot 306 are available for maximum scheduling, the maximum number of PDSCHs included in the HARQ-ACK codebook transmitted at slot 308 is a total of seven. This is referred to as cardinality of the HARQ-ACK codebook.

Figure 4:
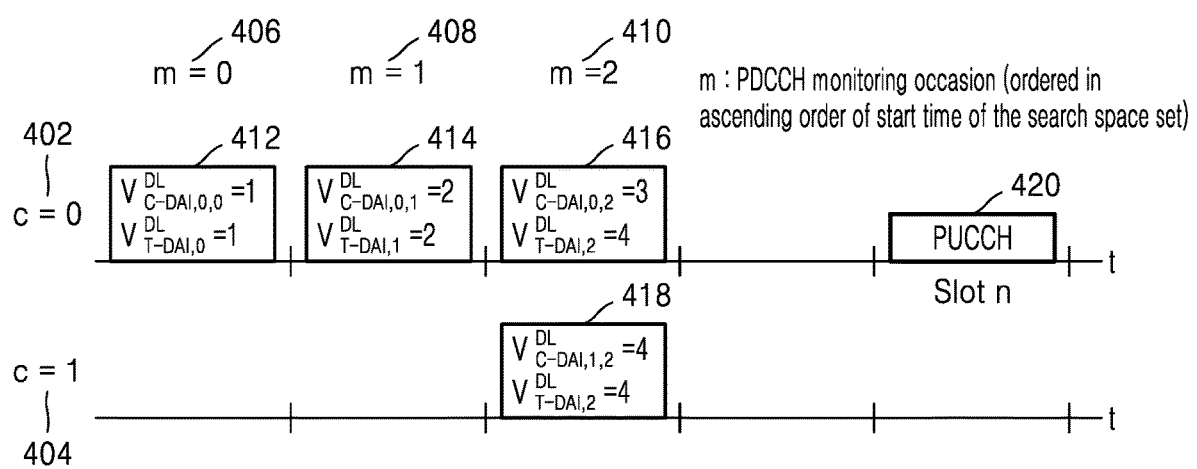
FIG. 4 is a diagram illustrating a method of configuring a dynamic HARQ-ACK codebook in an NR system, according to an embodiment of the present disclosure.

FIG. 4 is a diagram illustrating a method of configuring a dynamic HARQ-ACK codebook in an NR system, according to an embodiment of the present disclosure.

Based on a PDSCH-to-HARQ_feedback timing value for PUCCH transmission of HARQ-ACK information at slot n for PDSCH reception or SPS PDSCH release, and K0 that is transmission slot position information of PDSCH for scheduling in DCI format 1_0 or 1_1, the UE may transmit HARQ-ACK information transmitted within one PUCCH in slot n. Specifically, for the HARQ-ACK information transmission, based on a DAI included in DCI indicating PDSCH or SPS PDSCH release, the UE may determines the HARQ-ACK codebook of PDCCH transmitted at the slot determined by K0 and PDSCH-to-HARQ_feedback timing.

The DAI includes a counter DAI and a total DAI. The counter DAI is information in which the HARQ-ACK information corresponding to PDSCH scheduled in DCI format 1_0 or DCI format 1_1 indicates a position in the HARQ-ACK codebook. Specifically, a value of the counter DAI in DCI format 1_0 or DCI format 1_1 indicates a cumulative value of PDSCH reception or SPS PDSCH release scheduled by DCI format 1_0 or DCI format 1_1 in specific cell c. The cumulative value is configured based on a PDCCH monitoring occasion and a serving cell in which the scheduled DCI exists.

The total DAI is a value indicating the size of the HARQ-ACK codebook. Specifically, a value of the total DAI refers to the total number of PDSCH or SPS PDSCH releases, which are scheduled at and before the time point at which DCI is scheduled. The total DAI is a parameter used when HARQ-ACK information in serving cell c also includes HARQ-ACK information about PDSCH scheduled in another cell including serving cell c in a carrier aggregation (CA) situation. In other words, there is no total DAI parameter in a system operating with one cell.

FIG. 4 illustrates an example of the operation of the UE for the DAI. FIG. 4 shows that, in a situation where two carriers are configured for the UE, when the UE transmits an HARQ-ACK codebook selected based on a DAI, through a PUCCH 420 in an n-th slot of carrier 0 202, the values of a counter DAI (C-DAI) and a total DAI (T-DAI) indicated by DCI discovered in each PDCCH monitoring occasion configured for each of the carriers are changed. First, in DCI discovered at m=0 (406), each of the C-DAI and the T-DAI indicates a value 412 of 1. In DCI discovered at m=1 (408), each of the C-DAI and the T-DAI indicates a value 414 of 2. In DCI discovered in carrier 0 (c=0, 402) of m=2 (410), the C-DAI indicates a value 416 of 3. In DCI discovered in carrier 1 (c=1, 404) of m=2 (410), the C-DAI indicates a value 418 of 4. When carriers 0 and 1 are scheduled in the same monitoring occasion, all the T-DAIs are indicated by 4.

Referring to FIGS. 3 and 4, an operation, performed by the UE, of determining an HARQ-ACK codebook may be an operation in a situation where only one PUCCH containing HARQ-ACK information is transmitted on one slot. The operation, performed by the UE, of determining the HARQ-ACK codebook in a situation where only one PUCCH containing HARQ-ACK information is transmitted on one slot is referred to as mode 1. As an example of a method in which one PUCCH transmission resource is determined in one slot, when PDSCHs scheduled in different pieces of DCI are multiplexed into one HARQ-ACK codebook in the same slot and the HARQ-ACK codebook is transmitted, a PUCCH resource selected for HARQ-ACK transmission may be determined to be a PUCCH resource indicated by a PUCCH resource field indicated in DCI lastly scheduling a PDSCH. That is, a PUCCH resource indicated by a PUCCH resource field indicated in DCI scheduled before the DCI is neglected.

In the following description, methods and apparatuses for determining a HARQ-ACK codebook in a situation where two or more PUCCHs containing HARQ-ACK information may be transmitted on one slot are defined. The operation, performed by the UE, of determining the HARQ-ACK codebook in a situation where two or more PUCCHs containing HARQ-ACK information may be transmitted on one slot is referred to as mode 2. The UE may operate only mode 1 (transmission of only one HARQ-ACK PUCCH in one slot) or may operate only mode 2 (transmission of one or more HARQ-ACK PUCCHs in one slot). Alternatively, the UE supporting both mode 1 and mode 2 may be configured so that the base station operates in only one mode by higher layer signaling, or implicitly operates in mode 1 and mode 2 by a DCI format, an RNTI, a particular field value of DCI, and scrambling. For example, a PDSCH scheduled by a DCI format A and pieces of HARQ-ACK information associated with the PDSCH may be based on mode 1, and a PDSCH scheduled by a DCI format B and pieces of HARQ-ACK information associated with the PDSCH may be based on mode 2.

Next, in case that one or more PUCCHs including HARQ-ACK are transmitted on one slot in a situation where the UE according to the embodiment of the present disclosure performs one or more HARQ-ACK transmissions in one slot, the operating method of the UE in case of collision between PUCCHs when transmissions of PUCCHs including HARQ-ACK and another PUCCH including channel information or scheduling request information overlap each other in a specific OFDM symbol will be described. Also, the operating method of the UE in case of collision between PUCCHs when transmissions of the PUCCHs and the PUSCH transmitting UL data information overlap each other in a specific OFDM symbol will be described.

First Embodiment

Figure 5:
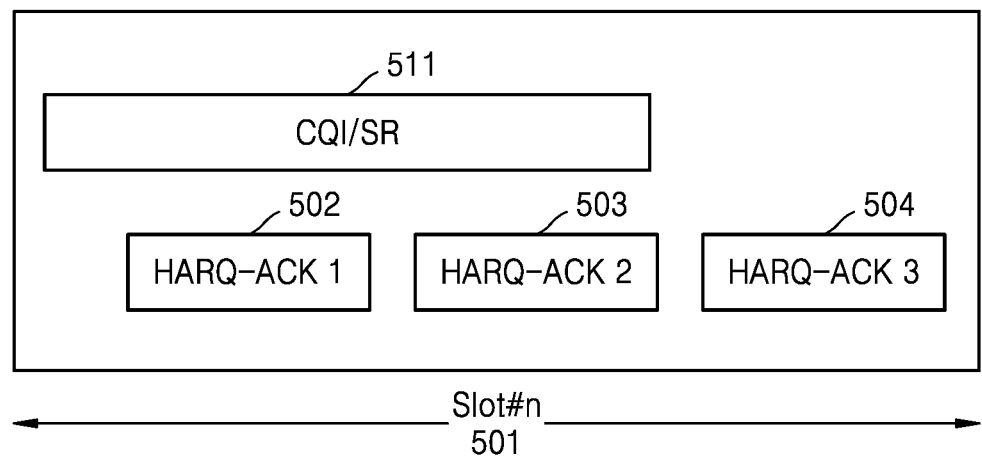
FIG. 5 is a diagram for describing an operating method of a terminal in case of collision between physical uplink control channels (PUCCHs) in one slot, according to a first embodiment of the present disclosure.

FIG. 5 is a diagram for describing an operating method of a UE in case of collision between PUCCHs in one slot, according to a first embodiment of the present disclosure. Referring to FIG. 5, in case that one or more PUCCHs including HARQ-ACK are transmitted on one slot, an example of a UL channel transmitted by the UE in case of collision between PUCCHs when transmissions of PUCCHs including HARQ-ACK and another PUCCH including channel information or SR information overlap each other in a specific OFDM symbol is illustrated.

First, the UE may receive simultaneousHARQ-ACK-CSI from the base station through a higher layer signal. According to the first embodiment of the present disclosure, when a collision between a PUCCH including channel quality information (CQI)/SR and a PUCCH including HARQ-ACK occurs in a specific OFDM symbol, the UE that receives the higher layer signal may multiplex UL control information such as the CQI/SR and the HARQ-ACK through a method to be described below. When the UE fails to receive simultaneousHARQ-ACK-CSI from the base station through the higher layer signal, the UE may drop the CQI. When the UE transmits a positive SR, the UE may multiplex the SR with the HARQ-ACK. When the UE transmits a negative SR, the UE may transmit only the HARQ-ACK.

In FIG. 5, the UE may receive configuration from the base station in advance through the higher layer signal with respect to a transmission occasion for a CQI/SR 511, a transmission resource, a parameter related to transmission, and pieces of information to be transmitted. Therefore, the UE may be required to transmit the CQI/SR 511 in slot #n, and may be aware of a time resource and a frequency resource required to perform transmission. Also, the UE may determine a PUCCH resource set according to an information bit size of HARQ-ACK 1 502, and may be aware of a time resource and a frequency resource required to transmit HARQ-ACK 1 502 from a PUCCH resource determined by a specific field of a PDCCH or a PDCCH resource.

Next, the UE may receive a PDSCH corresponding to HARQ-ACK 1 502 before slot #n 501 and may decode the received PDSCH. Also, the UE may determine that a processing time required to prepare for transmission of HARQ-ACK 1 502, that is, a value obtained by adding the processing time after the last symbol of the PDSCH, is located before the first symbol of a transmission time resource of the CQI/SR 511. Alternatively, the UE may not be required to determine the processing time for HARQ-ACK 1 502. For example, the base station may schedule the PDSCH corresponding to HARQ-ACK 1 502 considering the processing time for HARQ-ACK 1 502 and the first symbol of the time resource of the CQI/SR 511. When the base station does not schedule the PDSCH corresponding to HARQ-ACK 1 502 considering the processing time for HARQ-ACK 1 502 and the first symbol of the time resource of the CQI/SR 511, the UE may determine this case as an error. In this case, the base station may not predict a procedure to be applied by the UE for the above case. At this time, a UE procedure may change according to UE implementation.

The processing time for HARQ-ACK 1 502 may be given as a duration corresponding to a constant value after the last symbol of the PDSCH corresponding to HARQ-ACK 1 502. The constant value T is $(N1+d\_11+1)*(2048+144)*k*2^{(-}$ u)*T_c. N1 is a value related to processing capability of the UE and is a constant that may be determined based on subcarrier spacing (u) of the PDCCH or PDSCH. d_11 is a constant that may be determined based on the number of PDSCH symbols. K=64, and T_c is the basic time unit of NR and is 1/(480*10^3*4096).

When it is determined that the value obtained by adding the processing time for HARQ-ACK 1 502 after the last symbol of the PDSCH corresponding to HARQ-ACK 1 502 is located before the first symbol of the transmission time resource of the CQI/SR 511, or without the above determination, the UE may select a PUCCH resource set according to the size of the sum of information bits of the CQI/SR 511 and HARQ-ACK 1502, and may determine a new time resource and frequency resource A of a PUCCH required to transmit the CQI/SR 511 and HARQ-ACK 1 502 from the PUCCH resource determined by a PDCCH resource or a specific field through the PDCCH. The UE may determine a PUCCH resource set according to an information bit size of HARQ-ACK 2 503, and may be aware of a time resource and a frequency resource required to transmit HARQ-ACK 2 503 from a PUCCH resource determined by a specific field of a PDCCH or a PDCCH resource.

In this case, when the determined resource A does not overlap HARQ-ACK 2 503 in a specific OFDM symbol, the UE may multiplex HARQ-ACK 2 503 with the CQI/SR 511 and HARQ-ACK 1 502.

Specifically, the UE does not determine whether a processing time for transmitting HARQ-ACK 2 503 (that is, a processing time required to decode the PDSCH and prepare for transmission of HARQ-ACK 2 503) is located before a time resource of the frequency resource A, and may transmit the CQI/SR 511 and HARQ-ACK 1 502 through the PUCCH of the resource A.

Also, the UE may determine a PUCCH resource set to transmit HARQ-ACK 2 503 according to the information bit size of HARQ-ACK 2 503, and may transmit HARQ-ACK 2 503 by using a separate PUCCH through a time resource and a frequency resource required to transmit HARQ-ACK 2 503 that may be known from a PUCCH resource determined by a specific field of PDCCH or a PDCCH resource.

Next, when the determined resource A overlaps HARQ-ACK 2 503 in a specific OFDM symbol, the UE may not perform the procedure of multiplexing the CQI/SR 511 and HARQ-ACK 1 502, and may drop the CQI/SR 511. Alternatively, the UE may perform transmission by dropping only the CQI and multiplexing the SR with HARQ-ACK 1.

Specifically, the UE may determine a PUCCH resource set according to the information bit size of HARQ-ACK 1 502. Alternatively, when the SR is a negative SR, the UE may determine a PUCCH resource set according to the information bit of HARQ-ACK 1 502 or the information bit size of the sum of HARQ-ACK 1 502 and the SR. The UE may transmit HARQ-ACK 1 502 by using a PUCCH through a time resource and a frequency resource required to transmit HARQ-ACK 1 502 or HARQ-ACK 1 and the SR that may be known from a PUCCH resource determined by a specific field of PDCCH or a PDCCH resource.

The UE may determine a PUCCH resource set according to the information bit size of HARQ-ACK 2 503. The UE may transmit HARQ-ACK 2 503 through a separate PUCCH through a time resource and a frequency resource required to transmit HARQ-ACK 2 503 that may be known from the PUCCH resource determined by a specific field of PDCCH or a PDCCH resource.

Through the UE procedure according to the first embodiment of the present disclosure, a plurality of HARQ-ACKs are transmitted on one slot through a separate PUCCH, so that when there is an urgent DL data transmission such as URLLC, it is possible to directly provide HARQ-ACK feedback and satisfy a latency condition of the URLLC.

When HARQ-ACK 3 504 exists, the procedure performed on HARQ-ACK 2 503 by the UE may also be applied to HARQ-ACK 3 504.

Second Embodiment

Figure 6:
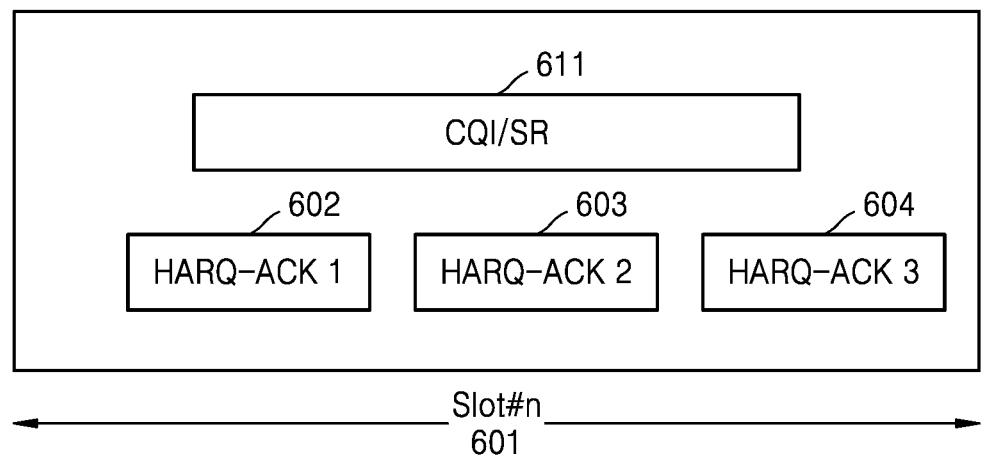
FIG. 6 is a diagram for describing an operating method of a terminal in case of collision between PUCCHs in one slot, according to a second embodiment of the present disclosure.

FIG. 6 is a diagram for describing an operating method of a UE in case of collision between PUCCHs in one slot, according to a second embodiment of the present disclosure. Referring to FIG. 6, in case that one or more PUCCHs including HARQ-ACK are transmitted on one slot, an example of a UL channel transmitted by the UE in case of collision between PUCCHs when transmissions of PUCCHs including HARQ-ACK and another PUCCH including channel information or SR information overlap each other in a specific OFDM symbol is illustrated.

First, the UE may receive simultaneousHARQ-ACK-CSI from the base station through a higher layer signal. According to the second embodiment of the present disclosure, when a collision between a PUCCH including HARQ-ACK and a PUCCH including CQI/SR occurs in a specific OFDM symbol, the UE that receives the higher layer signal may multiplex UL control information such as the HARQ/ACK and the CQI/SR through a method to be described below. When the UE fails to receive simultaneousHARQ-ACK-CSI from the base station through the higher layer signal, the UE may drop the CQI. When the UE transmits a positive SR, the UE may multiplex the SR with the HARQ-ACK. When the UE transmits a negative SR, the UE may transmit only the HARQ-ACK.

In FIG. 6, the UE may receive configuration from the base station in advance through the higher layer signal with respect to a transmission occasion for a CQI/SR 611, a transmission resource, a parameter related to transmission, and pieces of information to be transmitted. Therefore, the UE may be required to transmit the CQI/SR 611 in slot #n, and may be aware of a time resource and a frequency resource required to perform transmission. Also, the UE may determine a PUCCH resource set according to an information bit size of HARQ-ACK 1 602, and may be aware of a time resource and a frequency resource required to transmit HARQ-ACK 1 602 from a PUCCH resource determined by a specific field of a PDCCH or a PDCCH resource.

Next, the UE may receive a PDSCH corresponding to HARQ-ACK 1 602 before slot #n 601 and may decode the received PDSCH. Also, the UE may determine that a processing time required to prepare for transmission of HARQ-ACK 1 602, that is, a value obtained by adding the processing time after the last symbol of the PDSCH, is located before the first symbol of a transmission time resource of the CQI/SR 611. Alternatively, the UE may not be required to determine the processing time for the CQI/SR 611. For example, the base station may schedule the PDSCH corresponding to HARQ-ACK 1 602 considering the processing time for HARQ-ACK 1 602 and the first symbol of the time resource of the CQI/SR 611. When the base station does not schedule the PDSCH corresponding to HARQ-ACK 1 602 considering the processing time for HARQ-ACK 1 602 and the first symbol of the time resource of the CQI/SR 611, the UE may determine this case as an error. In this case, the base station may not predict a procedure to be applied by the UE for the above case. At this time, a UE procedure may change according to UE implementation.

The processing time for HARQ-ACK 1 602 may be given as a duration corresponding to a constant value after the last symbol of the PDSCH corresponding to HARQ-ACK 1 602. The constant value T is $(N1+d\_11+1)*(2048+144)*k*2^{(-u)}*T\_c$. N1 is a value related to processing capability of the UE and is a constant that may be determined based on subcarrier spacing (u) of the PDCCH or PDSCH. d_11 is a constant that may be determined based on the number of PDSCH symbols. K=64, and T_c is the basic time unit of NR and is $1/(480*10^3*4096)$.

When it is determined that the value obtained by adding the processing time for HARQ-ACK 1 602 after the last symbol of the PDSCH corresponding to HARQ-ACK 1 602 is located before the first symbol of the transmission time resource of the CQI/SR 611, or without the above determination, the UE may select a PUCCH resource set according to the size of the sum of information bits of HARQ-ACK 1 602 and the CQI/SR 611, and may determine a new time resource and frequency resource A of a PUCCH required to transmit the CQI/SR 611 and HARQ-ACK 1 602 from the PUCCH resource determined by a PDCCH resource or a specific field through the PDCCH. The UE may determine a PUCCH resource set according to an information bit size of HARQ-ACK 2 603, and may be aware of a time resource and a frequency resource required to transmit HARQ-ACK 2 603 from a PUCCH resource determined by a specific field of a PDCCH or a PDCCH resource.

In this case, when the determined resource A does not overlap HARQ-ACK 2 603 in a specific OFDM symbol, the UE may multiplex HARQ-ACK 2 603 with the CQI/SR 611 and HARQ-ACK 1 602.

Specifically, the UE does not determine whether a processing time for transmitting HARQ-ACK 2 603 (that is, a processing time required to decode the PDSCH and prepare for transmission of HARQ-ACK 2 603) is located before a time resource of the frequency resource A, and may transmit the CQI/SR 611 and HARQ-ACK 1 602 through the PUCCH of the resource A.

Also, the UE may determine a PUCCH resource set to transmit HARQ-ACK 2 603 according to the information bit size of HARQ-ACK 2 603, and may transmit HARQ-ACK 2 603 by using a separate PUCCH through a time resource and a frequency resource required to transmit HARQ-ACK 2 603 that may be known from a PUCCH resource determined by a specific field of PDCCH or a PDCCH resource.

Next, when the determined resource A overlaps HARQ-ACK 2 603 in a specific OFDM symbol, the UE may not perform the procedure of multiplexing the CQI/SR 611 and HARQ-ACK 1 602, and may drop the CQI/SR 611. Alternatively, the UE may perform transmission by dropping only the CQI and multiplexing the SR with HARQ-ACK 1.

Specifically, the UE may determine a PUCCH resource set according to the information bit size of HARQ-ACK 1 602. Alternatively, when the SR is a negative SR, the UE may determine a PUCCH resource set according to the information bit of HARQ-ACK 1 602 or the information bit size of the sum of HARQ-ACK 1 602 and the SR. The UE may transmit HARQ-ACK 1 602 by using a PUCCH through a time resource and a frequency resource required to transmit HARQ-ACK 1 602 or HARQ-ACK 1 602 and the SR that may be known from a PUCCH resource determined by a specific field of PDCCH or a PDCCH resource.

The UE may determine a PUCCH resource set according to the information bit size of HARQ-ACK 2 603. The UE may transmit HARQ-ACK 2 603 through a separate PUCCH through a time resource and a frequency resource required to transmit HARQ-ACK 2 603 that may be known from the PUCCH resource determined by a specific field of PDCCH or a PDCCH resource.

Through the UE procedure according to the second embodiment of the present disclosure, a plurality of HARQ-ACKs are transmitted on one slot through a separate PUCCH, so that when there is an urgent DL data transmission such as URLLC, it is possible to directly provide HARQ-ACK feedback and satisfy a latency condition of the URLLC.

When HARQ-ACK 3 604 exists, the procedure performed on HARQ-ACK 2 603 by the UE may also be applied to HARQ-ACK 3 604.

Third Embodiment

Figure 7:
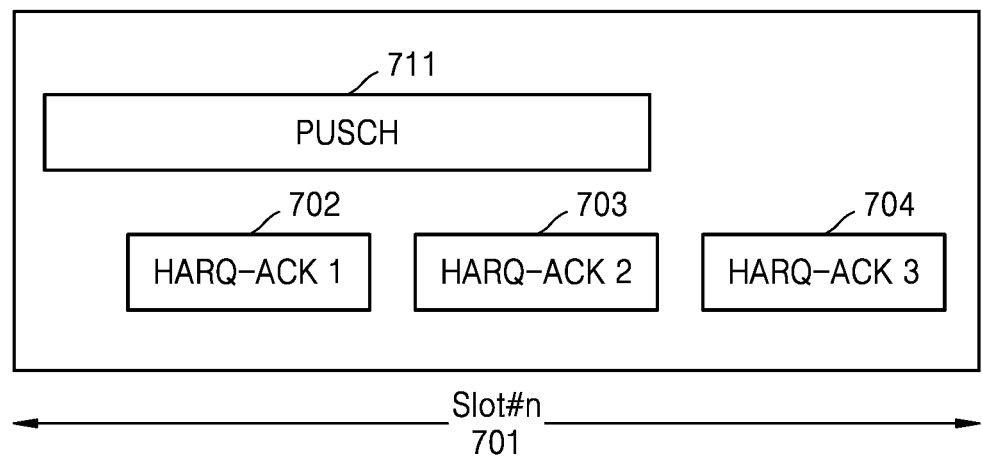
FIG. 7 is a diagram for describing an operating method of a terminal in case of collision between a PUCCH and a physical uplink shared channel (PUSCH) in one slot, according to a third embodiment of the present disclosure.

FIG. 7 is a diagram for describing an operating method of a terminal in case of collision between a PUCCH and a PUSCH in one slot, according to a third embodiment of the present disclosure. Referring to FIG. 7, in case that one or more PUCCHs including HARQ-ACK are transmitted on one slot, an example of a UL channel transmitted by the UE in case of collision between a PUCCH and a PUSCH when transmissions of PUCCHs including HARQ-ACK and a PUSCH transmitting UL data information overlap each other in a specific OFDM symbol is illustrated.

First, when the UE has simultaneous PUSCH/PUCCH transmission capability and transmits information about the capability to the base station, the UE may receive simultaneous PUSCH-PUCCH from the base station through a higher layer signal.

According to the third embodiment of the present disclosure, when a collision between a PUCCH including HARQ-ACK and a PUSCH required to transmit a UL-SCH occurs in a specific OFDM symbol, the UE that receives the higher layer signal may transmit the colliding PUCCH and PUSCH at the same time. When the UE does not have simultaneous PUSCH/PUCCH transmission capability or has simultaneous PUSCH/PUCCH transmission capability but has not received simultaneous PUSCH-PUCCH from the base station through a higher layer signal even after transmitting information about the capability to the base station, the UE may transmit a PUCCH and drop a PUSCH. Alternatively, the UE may transmit a channel prioritized according to the service type of the UE, and may drop the remaining channels. The UE may receive the service type or channel transmission priority of the UE from a CORESET or search space having a priority or a PDCCH having a priority or a specific field of a PDCCH transmitted by the base station.

In FIG. 7, the UE may receive a transmission resource for a PUSCH 711 and information about a parameter related to transmission from the base station through a higher layer signal and a PDCCH. Also, the UE may determine a PUCCH resource set according to the information bit size of HARQ-ACK 1 702, and may be aware of a time resource and a frequency resource required to transmit HARQ-ACK 1 702 from a PUCCH resource determined by a specific field of PDCCH or a PDCCH resource.

Next, the UE may receive a PDSCH corresponding to HARQ-ACK 1 702 before slot #n 701 and may decode the received PDSCH. Also, the UE may determine that a processing time required to prepare for transmission of HARQ-ACK 1 702, that is, a value obtained by adding the processing time after the last symbol of the PDSCH, is located before the first symbol of a transmission time resource of the PUSCH 711.

The processing time for HARQ-ACK 1 702 may be given as a duration corresponding to a constant value after the last symbol of the PDSCH corresponding to HARQ-ACK 1 702. The constant value T is $(N1+d\_11+1)*(2048+144)*k*2^{(-u)}*T\_c$. N1 is a value related to processing capability of the UE and is a constant that may be determined based on subcarrier spacing (u) of the PDCCH or PDSCH. d_11 is a constant that may be determined based on the number of PDSCH symbols. K=64, and T_c is the basic time unit of NR and is $1/(480*10^3*4096)$.

When it is determined that the value obtained by adding the processing time for HARQ-ACK 1 702 after the last symbol of the PDSCH corresponding to HARQ-ACK 1 720 is located before the first symbol of the transmission time resource of the PUSCH 711, the UE may multiplex HARQ-ACK 1 702 with the PUSCH 711. Specifically, the UE may determine a PUCCH resource set to transmit HARQ-ACK 2 703 according to the information bit size of HARQ-ACK 2 703. The UE may be aware of a time resource and a frequency resource required to transmit HARQ-ACK 2 703 from a PUCCH resource determined by a specific field of PDCCH or a PDCCH resource.

When the PUSCH 711 does not overlap HARQ-ACK 2 703 in a specific OFDM symbol, or when the UE receives simultaneousPUSCH-PUCCH even when the PUSCH 711 overlaps HARQ-ACK 2 703 in a specific OFDM symbol, the UE does not determine whether a processing time for transmitting a resource of the PUSCH 711 and HARQ-ACK 2 703 (that is, a processing time required to decode the PDSCH and prepare for transmission of HARQ-ACK 2 703) is located before a time resource of the PUSCH 711, in order to multiplex HARQ-ACK 2 703 with the PUSCH 711, and may transmit the PUSCH multiplexed with HARQ-ACK 1 702 in a resource of the PUSCH 711.

Also, the UE may determine a PUCCH resource set to transmit HARQ-ACK 2 703 according to the information bit size of HARQ-ACK 2 703, and may transmit HARQ-ACK 2 703 by using a separate PUCCH through a time resource and a frequency resource required to transmit HARQ-ACK 2 703 from a PUCCH resource determined by a PDCCH resource or a specific field through PDCCH.

In case that the PUSCH 711 overlaps HARQ-ACK 2 703 in a specific OFDM symbol, when the UE fails to receive simultaneousPUSCH-PUCCH or does not have simultaneous PUSCH/PUCCH capability, the UE may not perform the above procedure of multiplexing the PUSCH 711 and HARQ-ACK 1 702 and may drop the PUSCH 711.

Specifically the UE may determine a PUCCH resource set to transmit HARQ-ACK 1 702 according to the information bit size of HARQ-ACK 1 702, and may transmit HARQ-ACK 1 702 by using a PUCCH through a time resource and a frequency resource required to transmit HARQ-ACK 1 702 that may be known from a PUCCH resource determined by a specific field of PDCCH or a PDCCH resource.

Also, the UE may determine a PUCCH resource set to transmit HARQ-ACK 2 703 according to the information bit size of HARQ-ACK 2 703, and may transmit HARQ-ACK 2 703 by using a separate PUCCH through a time resource and a frequency resource required to transmit HARQ-ACK 2 703 that may be known from a PUCCH resource determined by a specific field of PDCCH or a PDCCH resource.

In the above-described embodiment, the example in which the UE drops the PUSCH and transmits HARQ-ACK 1 702 and HARQ-ACK 2 703 has been described, but when a prioritized channel is the PUSCH 711 according to the service type of the UE, the UE may transmit the PUSCH 711 and may drop PUCCHs that are the remaining channels.

Through the UE procedure according to the third embodiment of the present disclosure, a plurality of HARQ-ACKs are transmitted on one slot through a separate PUCCH, so that when there is an urgent DL data transmission such as URLLC, it is possible to directly provide HARQ-ACK feedback and satisfy a latency condition of the URLLC.

When HARQ-ACK 3 704 exists, the procedure performed on HARQ-ACK 2 703 by the UE may also be applied to HARQ-ACK 3 704.

Fourth Embodiment

Figure 8:
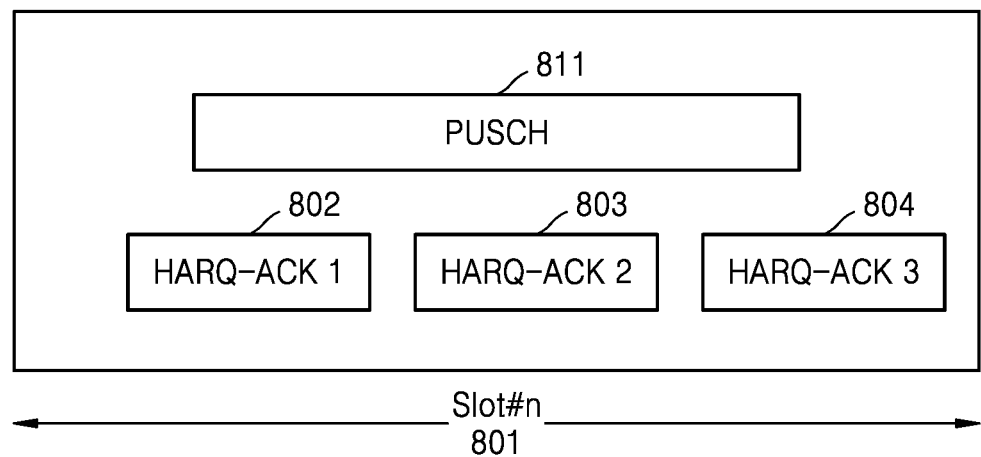
FIG. 8 is a diagram for describing an operating method of a terminal in case of collision between a PUCCH and a PUSCH in one slot, according to a fourth embodiment of the present disclosure.

FIG. 8 is a diagram for describing an operating method of a UE in case of collision between a PUCCH and a PUSCH in one slot, according to a fourth embodiment of the present disclosure. Referring to FIG. 8, in case that one or more PUCCHs including HARQ-ACK are transmitted on one slot, an example of a UL channel transmitted by the UE in case of collision between a PUCCH and a PUSCH when transmissions of PUCCHs including HARQ-ACK and a PUSCH transmitting UL data information overlap each other in a specific OFDM symbol is illustrated.

First, when the UE has simultaneous PUSCH/PUCCH transmission capability and transmits information about the capability to the base station, the UE may receive simultaneousPUSCH-PUCCH from the base station through a higher layer signal.

According to the fourth embodiment of the present disclosure, when a collision between a PUSCH required to transmit a UL-SCH and a PUCCH including HARQ-ACK occurs in a specific OFDM symbol, the UE that receives the higher layer signal may transmit the colliding PUCCH and PUSCH at the same time. When the UE does not have simultaneous PUSCH/PUCCH transmission capability or has simultaneous PUSCH/PUCCH transmission capability but has not received simultaneousPUSCH-PUCCH from the base station through a higher layer signal even after transmitting information about the capability to the base station, the UE may transmit a PUCCH and drop a PUSCH. Alternatively, the UE may transmit a channel prioritized according to the service type of the UE, and may drop the remaining channels. The UE may receive the service type or channel transmission priority of the UE from a CORESET or search space having a priority or a PDCCH having a priority or a specific field of a PDCCH transmitted by the base station.

In FIG. 8, the UE may receive a transmission resource for a PUSCH 811 and information about a parameter related to transmission from the base station through a higher layer signal and a PDCCH. Also, the UE may determine a PUCCH resource set according to the information bit size of HARQ-ACK 1 802, and may be aware of a time resource and a frequency resource required to transmit HARQ-ACK 1 802 from a PUCCH resource determined by a specific field of PDCCH or a PDCCH resource.

Next, the UE may receive a PDCCH for scheduling the PUSCH 811 before slot #n 801 and may decode the received PDSCH. Also, the UE may determine that a processing time required to prepare for transmission of PUSCH 1 811, that is, a value obtained by adding the processing time after the last symbol of the PDCCH, is located before the first symbol of a transmission time resource of HARQ-ACK 1 802.

The processing time for the PUSCH 811 may be given as a duration corresponding to a constant value after the last symbol of the PDCCH for scheduling the PUSCH 811. The constant value T is $\max\{(N2+d\_21+1)*(2048+144)*k*2^{(-u)}*T\_c, d\_22\}$. N2 is a value related to processing capability of the UE and is a constant that may be determined based on subcarrier spacing (u) of the PDCCH or PUSCH. d_21 is a constant that may be determined based on whether the first symbol of the PUSCH is configured by a DMRS only. K=64, and T_c is the basic time unit of NR and is $1/(480*10^3*4096)$. d_22 is a constant related to the switching of a bandwidth part (BWP).

When it is determined that the value obtained by adding the processing time for the PUSCH 811 after the last symbol of the PDCCH for scheduling the PUSCH 811 is located before the first symbol of the transmission time resource of HARQ-ACK 1 802, the UE may multiplex HARQ-ACK 1 802 with the PUSCH 811. The UE may determine a PUCCH resource set according to the information bit size of HARQ-ACK 2 803, and may be aware of a time resource and a frequency resource required to transmit HARQ-ACK 2 803 from a PUCCH resource determined by a specific field of PDCCH or a PDCCH resource.

When the PUSCH 811 does not overlap HARQ-ACK 2 803 in a specific OFDM symbol, or when the UE receives simultaneousPUSCH-PUCCH even when the PUSCH 811 overlaps HARQ-ACK 2 803 in a specific OFDM symbol, the UE may transmit the PUSCH multiplexed with HARQ-ACK 1 802 in a resource of the PUSCH 811.

Also, the UE may determine a PUCCH resource set to transmit HARQ-ACK 2 803 according to the information bit size of HARQ-ACK 2 803, and may transmit HARQ-ACK 2 803 by using a separate PUCCH through a time resource and a frequency resource required to transmit HARQ-ACK 2 803 from a PUCCH resource determined by a PDCCH resource or a specific field through PDCCH.

In case that the PUSCH 811 overlaps HARQ-ACK 2 803 in a specific OFDM symbol, when the UE fails to receive simultaneousPUSCH-PUCCH or does not have simultaneous PUSCH/PUCCH capability, the UE may not perform the above procedure of multiplexing the PUSCH 811 and HARQ-ACK 1 802 and may drop the PUSCH 811.

Specifically the UE may determine a PUCCH resource set to transmit HARQ-ACK 1 802 according to the information bit size of HARQ-ACK 1 802, and may transmit HARQ-ACK 1 802 by using a PUCCH through a time resource and a frequency resource required to transmit HARQ-ACK 1 802 that may be known from a PUCCH resource determined by a specific field of PDCCH or a PDCCH resource.

Also, the UE may determine a PUCCH resource set to transmit HARQ-ACK 2 803 according to the information bit size of HARQ-ACK 2 803, and may transmit HARQ-ACK 2 803 by using a separate PUCCH through a time resource and a frequency resource required to transmit HARQ-ACK 2 803 that may be known from a PUCCH resource determined by a specific field of PDCCH or a PDCCH resource.

In the above-described embodiment, the example in which the UE drops the PUSCH and transmits HARQ-ACK 1 802 and HARQ-ACK 2 803 has been described, but when a prioritized channel is the PUSCH 811 according to the service type of the UE, the UE may transmit the PUSCH 811 and may drop PUCCHs that are the remaining channels.

Through the UE procedure according to the fourth embodiment of the present disclosure, a plurality of HARQ-ACKs are transmitted on one slot through a separate PUCCH, so that when there is an urgent DL data transmission such as URLLC, it is possible to directly provide HARQ-ACK feedback and satisfy a latency condition of the URLLC.

When HARQ-ACK 3 804 exists, the procedure performed on HARQ-ACK 2 803 by the UE may also be applied to HARQ-ACK 3 804.

Figure 9:
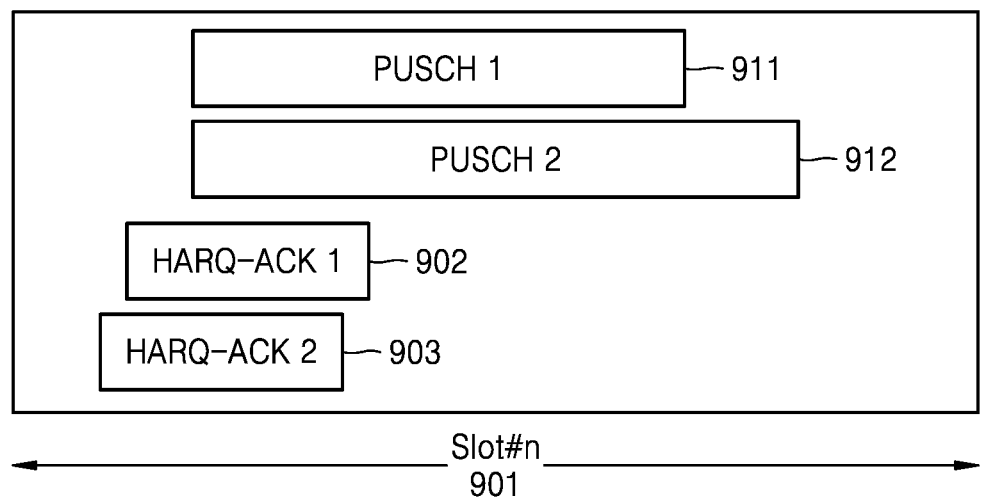
FIG. 9 is a diagram for describing an operating method of a terminal in case of collision between a PUCCH and a PUSCH in one slot, according to a fifth embodiment of the present disclosure.

Fifth Embodiment: In Case that Transmission of Multiple PUSCHs is Scheduled and Overlaps PUCCH Transmissions FIG. 9 is a diagram for describing an operating method of a UE in case of collision between a PUCCH and a PUSCH in one slot, according to a fifth embodiment of the present disclosure. Referring to FIG. 9, in case that one or more PUCCHs including HARQ-ACK are transmitted on one slot and the PUCCHs and a plurality of PUSCHs for transmitting UL data information overlap each other in a specific OFDM symbol, an example of a UL channel transmitted by the UE in case of collision between a PUCCH and a PUSCH is illustrated.

When transmission and reception from multi-TRP is configured for the UE, the PDCCH may be scheduled for the UE to transmit a plurality of PUSCHs in at least one cell. In this case, each TRP may independently transmit, to the UE, a PDCCH for scheduling a PUSCH of the UE. A plurality of PUSCHs may temporally overlap each other in at least one cell, or the start symbols may be equal to each other even when the durations of the plurality of PUSCHs are equal to or different from each other. In transmission and reception from multi-TRP, multi-TRPs may be connected to each other through an ideal backhaul, and thus, UL control information received from the UE in real time may be shared between multi-TRPs. Multi-TRPs may be connected to each other through a non-ideal backhaul, and thus, UL control information received from the UE in real time may be difficult to share between multi-TRP.

First, when the UE has simultaneous PUSCH/PUCCH transmission capability and transmits information about the capability to the base station or at least one TRP, the UE may receive the simultaneousPUSCH-PUCCH from the base station or the TRP through a higher layer signal.

According to the fifth embodiment of the present disclosure, when a collision between a PUCCH including HARQ-ACK and a PUSCH required to transmit a UL-SCH occurs in a specific OFDM symbol, the UE that receives the higher layer signal may transmit the colliding PUCCH and PUSCH at the same time. When the UE does not have simultaneous PUSCH/PUCCH transmission capability or has simultaneous PUSCH/PUCCH transmission capability but has not received simultaneousPUSCH-PUCCH from the base station through a higher layer signal even after transmitting information about the capability to the base station, the UE may transmit a PUCCH and drop a PUSCH. Alternatively, the UE may transmit a channel prioritized according to the service type of the UE, and may drop the remaining channels. The UE may receive the service type or channel transmission priority of the UE from a CORESET or search space having a priority or a PDCCH having a priority or a specific field of a PDCCH transmitted by the base station.

In FIG. 9 the UE may receive a transmission resource for a PUSCH 1 911 or PUSCH 2 912 and information about a parameter related to transmission from the base station or one or more TRPs through a higher layer signal and a PDCCH. Also, the UE may determine a PUCCH resource set according to the information bit size of HARQ-ACK 1 902 or HARQ-ACK 2 903, and may be aware of a time resource and a frequency resource required to transmit HARQ-ACK 1 902 or HARQ-ACK 2 903 from a PUCCH resource determined by a specific field of PDCCH or a PDCCH resource. PUSCH 1 911 and PUSCH 2 912 may be UL data transmission channels scheduled in different TRPs, and HARQ-ACK 1 902 and HARQ-ACK 2 903 may be feedback for PDSCH scheduled in different TRPs.

Next, the UE may receive PDSCHs corresponding to HARQ-ACK 1 902 or HARQ-ACK 2 903 in the same slot as slot #n 901 or a slot earlier than slot #n 901, and may decode the received PDSCHs. Also, the UE may determine that a processing time required to prepare for transmission of HARQ-ACK 1 902 or HARQ-ACK 2 903, that is, a value obtained by adding the processing time after the last symbol of the PDSCH, is located before the first symbol of a transmission time resource of PUSCH 1 911 or PUSCH 2 912.

The processing time required to prepare for transmission of HARQ-ACK 1 902 or HARQ-ACK 2 903 may be given as a duration corresponding to a constant value after the last symbol of the PDSCH corresponding to HARQ-ACK 1 902 or HARQ-ACK 2 903. The constant value T is $(N1+d\_11+1)*(2048+144)*k*2^{(-u)}*T\_c$. N1 is a value related to processing capability of the UE and is a constant that may be determined based on subcarrier spacing (u) of the PDCCH or PDSCH. d_11 is a constant that may be determined based on the number of PDSCH symbols. K=64, and T_c is the basic time unit of NR and is $1/(480*10^3*4096)$.

When it is determined that the sum of the processing time from the last symbol of the PDSCHs is located before the first symbol of the transmission time resource of PUSCH 1 911 or PUSCH 2 912, the UE may select one of PUSCH 1 911 or PUSCH 2 912 so as to multiplex HARQ-ACK 1 902 or HARQ-ACK 2 903 to PUSCH 1 911 or PUSCH 2 912.

Hereinafter, a method of selecting at least one of a plurality of PUSCHs in at least one cell when the UE multiplexes the HARQ-ACKs 902 and 903, according to the present disclosure, will be described. That is, when a plurality of PUSCHs temporally overlap each other in at least one cell, a method, performed by the UE, of selecting one PUSCH is proposed.

(Method 1) When a PUSCH is transmitted on each cell in carrier aggregation, the UE may select a PUSCH of a cell having a smallest cell index and multiplex HARQ-ACK or select a PUSCH requesting aperiodic channel information.

(Method 2) When there are a plurality of PUSCHs in one cell, the UE may select a PUSCH based on positions of start symbols of the PUSCH. That is, the UE may multiplex HARQ-ACK by selecting a PUSCH having an earliest start symbol position among PUSCHs temporally overlapping HARQ-ACK.

(Method 3) When there are a plurality of PUSCHs having an earliest start symbol position, the UE may select a PUSCH based on at least one of a duration of a PUSCH, an amount of resource allocation of a PUSCH, an MCS order, or a start PRB position, a code rate, or the number of layers in the PUSCH resource allocation. The UE may select the PUSCH based on at least one of the duration of the PUSCH (e.g. long PUSCH), the amount of resource allocation of the PUSCH scheduled on the PDCCH (e.g., PDSCH with a large amount of resource allocation), the MCS order of the PUSCH (e.g. PDSCH with low MCS order), or the start PRB position (e.g., the PUSCH having the lowest start PRB position), the coding rate (e.g., in case that the coding rate is low), or the number of layers (e.g., in case that the number of layers is great) in the PUSCH resource allocation. When one PUSCH may not be selected because a plurality of PUSCHs are selected even when a PUSCH is selected by applying one of the above-described parameters, the UE may select a PUSCH based on at least two conditions. When the PUSCH duration, the amount of resource allocation of the PUSCH, or the MCS order is the same, the UE may select a PUSCH having a lowest frequency PRB or a PUSCH having a highest frequency PRB in the PUSCH resource allocation.

(Method 4) When a grant-less PUSCH transmitted by the UE according to at least one parameter set by the higher layer signal in the resource configured by the higher layer signal and a PUSCH scheduled by the PDCCH have the same start symbol, the UE may select the grant-based PUSCH. By selecting the grant-based PUSCH, the grant-less-based PUSCH is highly likely to be configured by minimizing PUSCH transmission resources so as to minimize resource waste. In the grant-based PUSCH, the base station may adjust the amount of PUSCH resources in real time so as to multiplex HARQ-ACK.

(Method 5) The UE may select a PUSCH according to whether the multi-TRP transmission and reception backhaul is ideal or non-ideal. For example, when the multi-TRP transmission and reception backhaul is ideal, the UE may select one PUSCH for all TRPs, and when the multi-TRP transmission and reception backhaul is non-ideal, the UE may select one PUSCH for each TRP so that HARQ-ACK for each TRP is transmitted to each PUSCH scheduled in each TRP. Accordingly, the base station or at least one TRP may indicate whether to select one PUSCH for all TRPs or one PUSCH for each TRP through the higher layer signal transmitted to the UE.

According to an embodiment, when one PUSCH is applied to all TRPs, Method 1, Method 2, Method 3, and Method 4 may be applied as a method, performed by the UE, of selecting one of a plurality of PUSCHs. When one PUSCH is applied to each TRP, Method 1, Method 2, Method 3, and Method 4 may be applied as a method, performed by the UE, of selecting one PUSCH per TRP from among a plurality of PUSCHs.

Even when HARQ-ACK is multiplexed to one PUSCH for each TRP by applying one PUSCH to each TRP, channel information may be multiplexed only to a PUSCH transmitted through one specific TRP. This is because, even when the channel information is delayed in time, there may be no major problem in operating the system.

The method of selecting the PUSCH so as to multiplex HARQ-ACK to the PUSCH has been mainly described, but the above-described methods may be equally applied to the case of multiplexing, to the PUSCH, pieces of UL control information in addition to HARQ-ACK, for example, SR, channel information, etc. which may be transmitted to the PUCCH.

Methods 1 to 5 described above may be applied to the UE by combining at least two methods, or may be applied to the UE by a method of setting a specific method by a higher layer signal.

Figure 10:
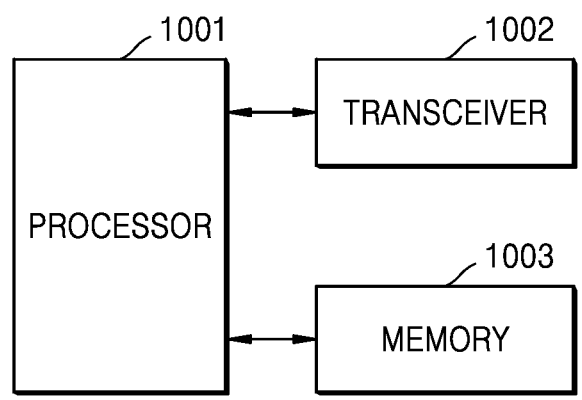
FIG. 10 is a block diagram illustrating a structure of a terminal, according to an embodiment of the present disclosure.

FIG. 10 is a block diagram illustrating a structure of a UE, according to an embodiment of the present disclosure.

Referring to FIG. 10, the UE according to the present disclosure may include a processor 1010, a transceiver 1020, and a memory 1030. However, the elements of the UE are not limited to the above-described example. For example, the UE may include more or fewer elements than the above-described elements. In addition, the processor 1010, the transceiver 1020, and the memory 1030 may be implemented in the form of a single chip.

According to an embodiment, the processor 1010 may control a series of processes to enable the UE to operate according to the above-described embodiment of the present disclosure. For example, the processor 1010 may control the elements of the UE to perform a method of transmitting UL control information through a plurality of UL channels, according to an embodiment of the present disclosure. A plurality of processors 1010 may be provided. The processor 1010 may execute a program stored in the memory 1030 to perform an operation of transmitting UL control information through a plurality of UL channels, according to the present disclosure.

The transceiver 1020 may transmit and receive signals with a base station. The signals transmitted and received with the base station may include control information and data. The transceiver 1020 may include an RF transmitter that performs up-conversion and amplification on a frequency of a signal to be transmitted, and an RF receiver that performs low-noise amplification on a received signal and performs down-conversion on a frequency of the received signal. However, this is only an embodiment of the transceiver 1020, and the elements of the transceiver 1020 are not limited to the RF transmitter and the RF receiver. Also, the transceiver 1020 may receive a signal through a radio channel, output the received signal to the processor 1010, and transmit an output signal of the processor 1010 through a radio channel.

According to an embodiment, the memory 1030 may store programs and data required for operations of the UE. Also, the memory 1030 may store control information or data included in signals transmitted and received by the UE. The memory 1030 may include a storage medium such as read-only memory (ROM), random access memory (RAM), hard disk, compact disc read-only memory (CD-ROM), and digital versatile disc (DVD), or any combination thereof. Also, a plurality of memories 1030 may be provided. According to an embodiment, the memory 1030 may store a program for transmitting UL control information through a plurality of uplink channels that are the above-described embodiments of the present disclosure.

Figure 11:
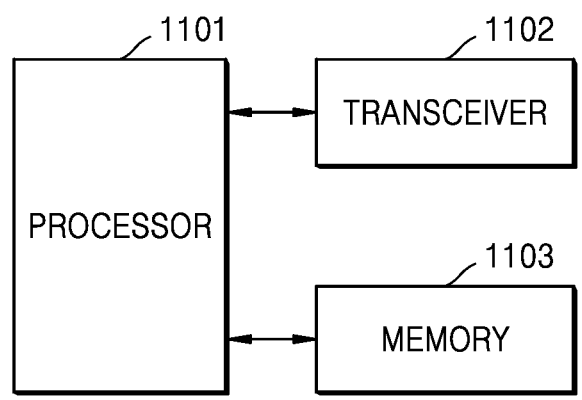
FIG. 11 is a block diagram illustrating a structure of a base station, according to an embodiment of the present disclosure.

FIG. 11 is a block diagram illustrating a structure of a base station, according to an embodiment of the present disclosure.

Referring to FIG. 11, the base station according to the present disclosure may include a processor 1110, a transceiver 1120, and a memory 1130. However, the elements of the UE are not limited to the above-described example. For example, the UE may include more or fewer elements than the above-described elements. In addition, the processor 1110, the transceiver 1120, and the memory 1130 may be implemented in the form of a single chip.

According to an embodiment, the processor 1110 may control a series of processes to enable the UE to operate according to the above-described embodiment of the present disclosure. For example, the processor 1110 may control the elements of the UE to perform a method of transmitting UL control information through a plurality of UL channels, according to an embodiment of the present disclosure. A plurality of processors 1110 may be provided. The processor 1110 may execute a program stored in the memory 1130 to perform an operation of transmitting UL control information through a plurality of UL channels, according to the present disclosure.

The transceiver 1120 may transmit and receive signals with a base station. The signals transmitted and received with the base station may include control information and data. The transceiver 1120 may include an RF transmitter that performs up-conversion and amplification on a frequency of a signal to be transmitted, and an RF receiver that performs low-noise amplification on a received signal and performs down-conversion on a frequency of the received signal. However, this is only an embodiment of the transceiver 1120, and the elements of the transceiver 1120 are not limited to the RF transmitter and the RF receiver. Also, the transceiver 1120 may receive a signal through a radio channel, output the received signal to the processor 1110, and transmit an output signal of the processor 1110 through a radio channel.

According to an embodiment, the memory 1130 may store programs and data required for operations of the UE. Also, the memory 1130 may store control information or data included in signals transmitted and received by the UE. The memory 1130 may include a storage medium such as ROM, RAM, hard disk, CD-ROM, and DVD, or any combination thereof. Also, a plurality of memories 1130 may be provided. According to an embodiment, the memory 1130 may store a program for transmitting UL control information through a plurality of uplink channels that are the above-described embodiments of the present disclosure.

On the other hand, the embodiments of the present disclosure, which are described in this specification and drawings, are merely presented as specific examples so as to easily explain the technical idea of the present disclosure and help the understanding of the present disclosure and are not intended to limit the scope of the present disclosure. That is, it will be obvious to those of ordinary skill in the art that other modifications based on the technical idea of the present disclosure may be made. In addition, the respective embodiments may be operated in combination with each other as necessary. For example, the base station and the UE may operate in combination of some of the first to fifth embodiments of the present disclosure. Also, although the above-described embodiments have been presented based on the NR system, other modifications based on the technical idea of the embodiments may also be applied to other systems such as FDD or TDD LTE systems.

Also, preferred embodiments of the present disclosure have been described and illustrated in the present specification and drawings. Although certain terms are used herein, this is merely used in a general sense to easily describe the technical idea of the present disclosure and to help understanding of the present disclosure, and is not intended to limit the scope of the present disclosure. It will be obvious to those of ordinary skill in the art that other modifications based on the technical idea of the present disclosure may be made.

The invention claimed is:

1. A method, performed by a user equipment (UE), of transmitting an uplink channel in a wireless communication system, the method comprising:
   determining a transmission resource of at least one physical uplink control channel (PUCCH) for transmitting uplink control information (UCI);
   determining a transmission resource of a first physical uplink shared channel (PUSCH) to be transmitted to a first transmission and reception point (TRP), the first PUSCH overlapping the at least one PUCCH on a time resource;
   determining a transmission resource of a second PUSCH to be transmitted to a second TRP, the second PUSCH overlapping the at least one PUCCH on the time resource;
   identifying whether the first PUSCH and the second PUSCH are overlapped and a start symbol of the transmission resource of the first PUSCH is different from a start symbol of the transmission resource of the second PUSCH;
   in case that the first PUSCH and the second PUSCH are overlapped and the start symbol of the transmission resource of the first PUSCH is different from the start symbol of the transmission resource of the second PUSCH, multiplexing the UCI to a PUSCH transmitted on a transmission resource having an earlier start symbol from among the first PUSCH and the second PUSCH;
transmitting the first PUSCH to the first TRP; and
transmitting the second PUSCH to the second TRP.

2. The method of claim 1, wherein the multiplexing of the UCI comprises multiplexing the UCI to a PUSCH transmitted on a cell having a smallest cell index from among the first PUSCH and the second PUSCH.

3. The method of claim 1, wherein the multiplexing of the UCI comprises, in case that the first PUSCH and the second PUSCH are overlapped and the start symbol of the transmission resource of the first PUSCH is not different from the start symbol of the transmission resource of the second PUSCH, multiplexing the UCI to a PUSCH from among the first PUSCH and the second PUSCH, the PUSCH being determined based on at least one of a transmission resource, a modulation and coding scheme (MCS) order, a coding rate, or a number of layers.

4. The method of claim 1, wherein the multiplexing of the UCI comprises multiplexing the UCI to a PUSCH from among the first PUSCH and the second PUSCH, the PUSCH being scheduled by a physical downlink control channel (PDCCH).

5. The method of claim 1,
wherein the multiplexing of the UCI comprises multiplexing the UCI to at least one PUSCH from among the first PUSCH and the second PUSCH, the at least one PUSCH being determined based on a type of a backhaul to which the first TRP and the second TRP are connected, and
wherein the backhaul is an ideal backhaul or a non-ideal backhaul.

6. The method of claim 5,
wherein, in case that the backhaul is the non-ideal backhaul, the at least one PUSCH is determined as one of the first PUSCH and the second PUSCH, and
wherein, in case that the backhaul is the ideal backhaul, the at least one PUSCH is determined as the first PUSCH and the second PUSCH.

7. The method of claim 1, wherein a start symbol of the transmission resource of the at least one PUCCH is earlier than the start symbol of the transmission resource of the first PUSCH and the start symbol of the transmission resource of the second PUSCH.

8. The method of claim 1, wherein the UCI comprises first hybrid automatic repeat request-acknowledgment (HARQ-ACK) information to be transmitted to the first TRP and second HARQ-ACK information to be transmitted to the second TRP.

9. A user equipment (UE) for transmitting an uplink channel in a wireless communication system, the UE comprising:
a transceiver; and
at least one processor connected to the transceiver, wherein the at least one processor is configured to:
determine a transmission resource of at least one physical uplink control channel (PUCCH) for transmitting uplink control information (UCI),
determine a transmission resource of a first physical uplink shared channel (PUSCH) to be transmitted to a first transmission and reception point (TRP), the first PUSCH overlapping the at least one PUCCH on a time resource,
determine a transmission resource of a second PUSCH to be transmitted to a second TRP, the second PUSCH overlapping the at least one PUCCH on the time resource,
identify whether the first PUSCH and the second PUSCH are overlapped and a start symbol of the transmission resource of the first PUSCH is different from a start symbol of the transmission resource of the second PUSCH,
in case that the first PUSCH and the second PUSCH are overlapped and the start symbol of the transmission resource of the first PUSCH is different from the start symbol of the transmission resource of the second PUSCH, multiplex the UCI to a PUSCH transmitted on a transmission resource having an earlier start symbol from among the first PUSCH and the second PUSCH,
transmit the first PUSCH to the first TRP, and
transmit the second PUSCH to the second TRP.

10. The UE claim 9, wherein the at least one processor is further configured to multiplex the UCI to a PUSCH transmitted on a cell having a smallest cell index from among the first PUSCH and the second PUSCH.

11. The UE of claim 9, wherein, in case that the first PUSCH and the second PUSCH are overlapped and the start symbol of the transmission resource of the first PUSCH is not different from the start symbol of the transmission resource of the second PUSCH, the at least one processor is further configured to multiplex the UCI to a PUSCH from among the first PUSCH and the second PUSCH, the PUSCH being determined based on at least one of a transmission resource, a modulation and coding scheme (MCS) order, a coding rate, or a number of layers.

12. The UE of claim 9, wherein the at least one processor is further configured to multiplex the UCI to a PUSCH from among the first PUSCH and the second PUSCH, the PUSCH being scheduled by a physical downlink control channel (PDCCH).

13. The UE of claim 9,
wherein the at least one processor is further configured to multiplex the UCI to at least one PUSCH from among the first PUSCH and the second PUSCH, the at least one PUSCH being determined based on a type of a backhaul to which the first TRP and the second TRP are connected, and
wherein the backhaul is an ideal backhaul or a non-ideal backhaul.

* * * * *